US012467069B2

(12) United States Patent
Jung et al.

(10) Patent No.: US 12,467,069 B2
(45) Date of Patent: Nov. 11, 2025

(54) CIS-ACONITATE SYNTHESIS ENZYME AND USES THEREOF

(71) Applicant: POSTECH RESEARCH AND BUSINESS DEVELOPMENT FOUNDATION, Pohang-si (KR)

(72) Inventors: Gyoo Yeol Jung, Pohang-si (KR); Jae Seong Yang, Pohang-si (KR); Myung Hyun Noh, Pohang-si (KR); Dae Yeol Ye, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 392 days.

(21) Appl. No.: 18/192,868

(22) Filed: Mar. 30, 2023

(65) Prior Publication Data

US 2023/0313239 A1 Oct. 5, 2023

(30) Foreign Application Priority Data

Apr. 5, 2022 (KR) ........................ 10-2022-0042345
Dec. 29, 2022 (KR) ........................ 10-2022-0189584

(51) Int. Cl.

*C12P 7/46* (2006.01)
*C12N 1/20* (2006.01)
*C12N 9/88* (2006.01)
*C12N 15/52* (2006.01)
*C12N 15/70* (2006.01)

(52) U.S. Cl.

CPC .................. *C12P 7/46* (2013.01); *C12N 1/20* (2013.01); *C12N 9/88* (2013.01); *C12N 15/52* (2013.01); *C12N 15/70* (2013.01); *C12Y 401/01006* (2013.01); *C12Y 402/01079* (2013.01); *C12N 2800/101* (2013.01)

(58) Field of Classification Search

CPC ............ C12P 7/46; C12N 15/52; C12N 15/70
See application file for complete search history.

*Primary Examiner* — Lynn Y Fan
(74) *Attorney, Agent, or Firm* — LEX IP MEISTER, PLLC

(57) ABSTRACT

Provided is a novel cis-aconitate synthesis enzyme, more particularly, a recombinant microorganism for producing itaconate including a cis-aconitate synthesis enzyme variant. According to the present disclosure, it was confirmed that the production and yield of itaconate were significantly increased in the recombinant microorganism for producing itaconate into which the novel cis-aconitate synthesis enzyme was introduced. In addition, it was confirmed that in the recombinant microorganism for producing itaconate of the present disclosure, a new carbon flow to itaconate was separated from the existing TCA cycle based on the activity of the corresponding enzyme. Accordingly, the novel aconitate synthesis enzyme of the present disclosure and the recombinant microorganism introduced with the aconitate synthesis enzyme can increase the economic feasibility of itaconate, and thus can be used in various industrial fields, such as synthetic resins, latexes, and food additives in which itaconate is used.

14 Claims, 6 Drawing Sheets

Specification includes a Sequence Listing.

【Figure 1】
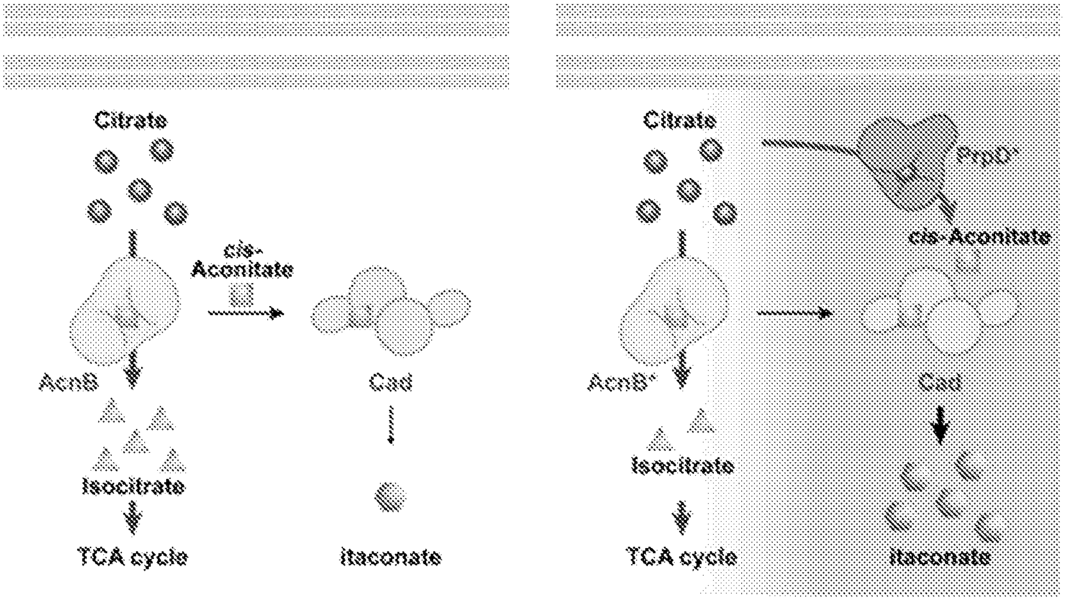

【Figure 2】
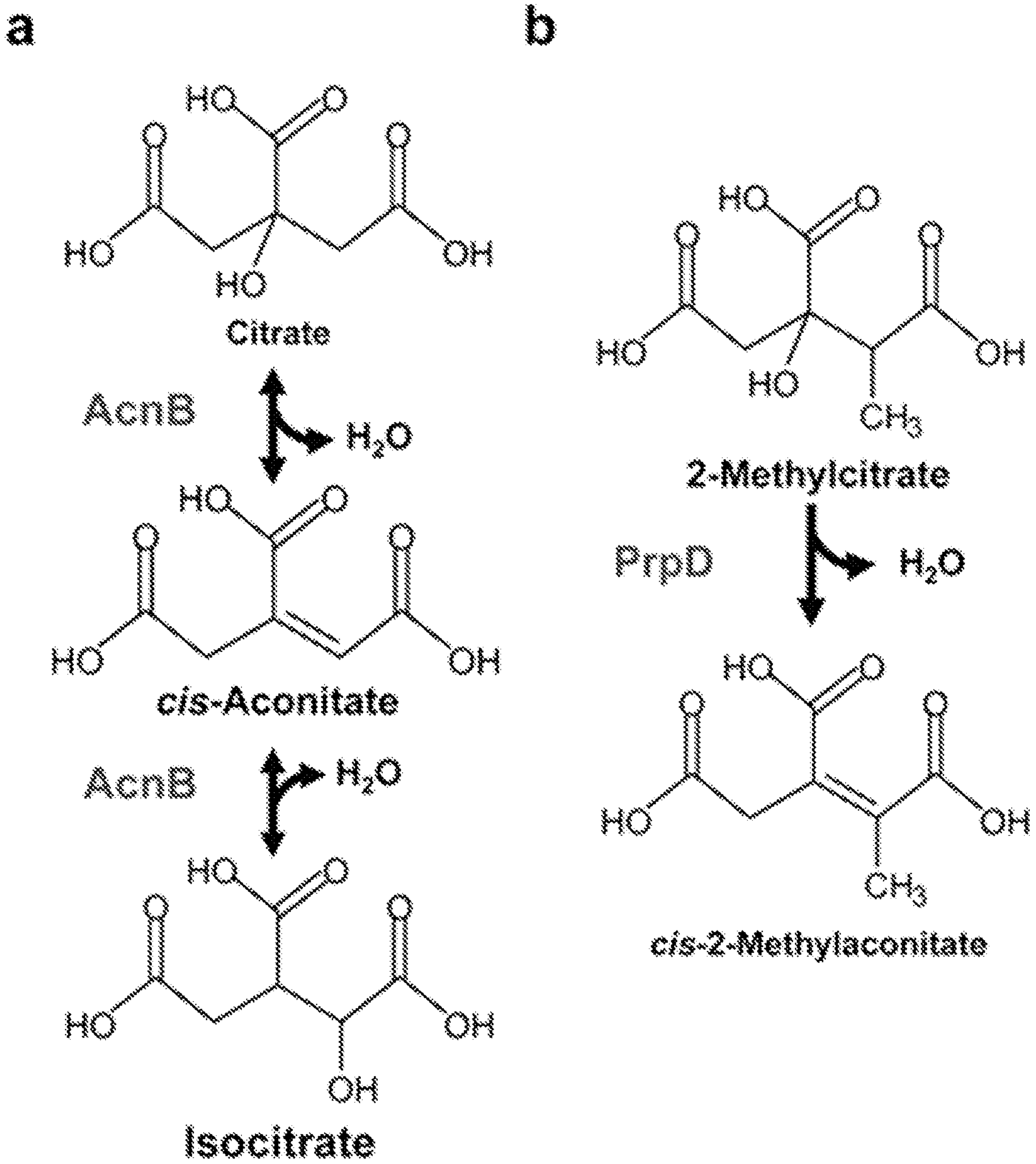

【Figure 3】
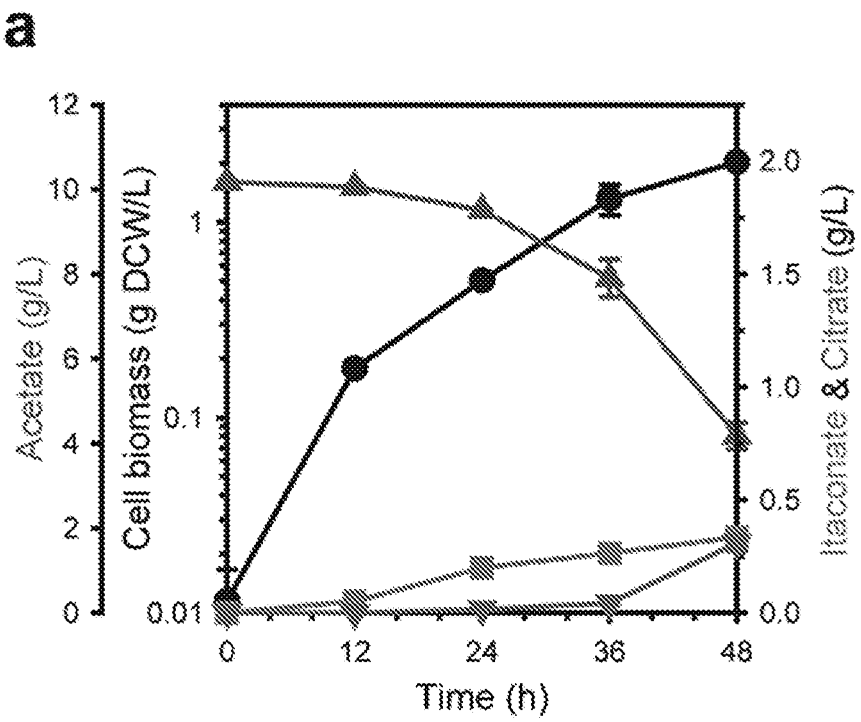
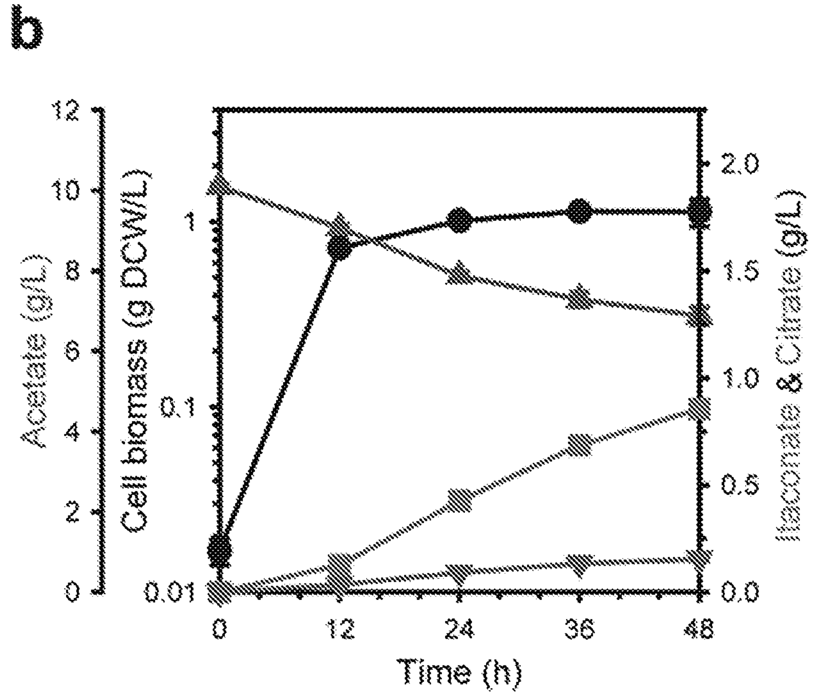

【Figure 4】
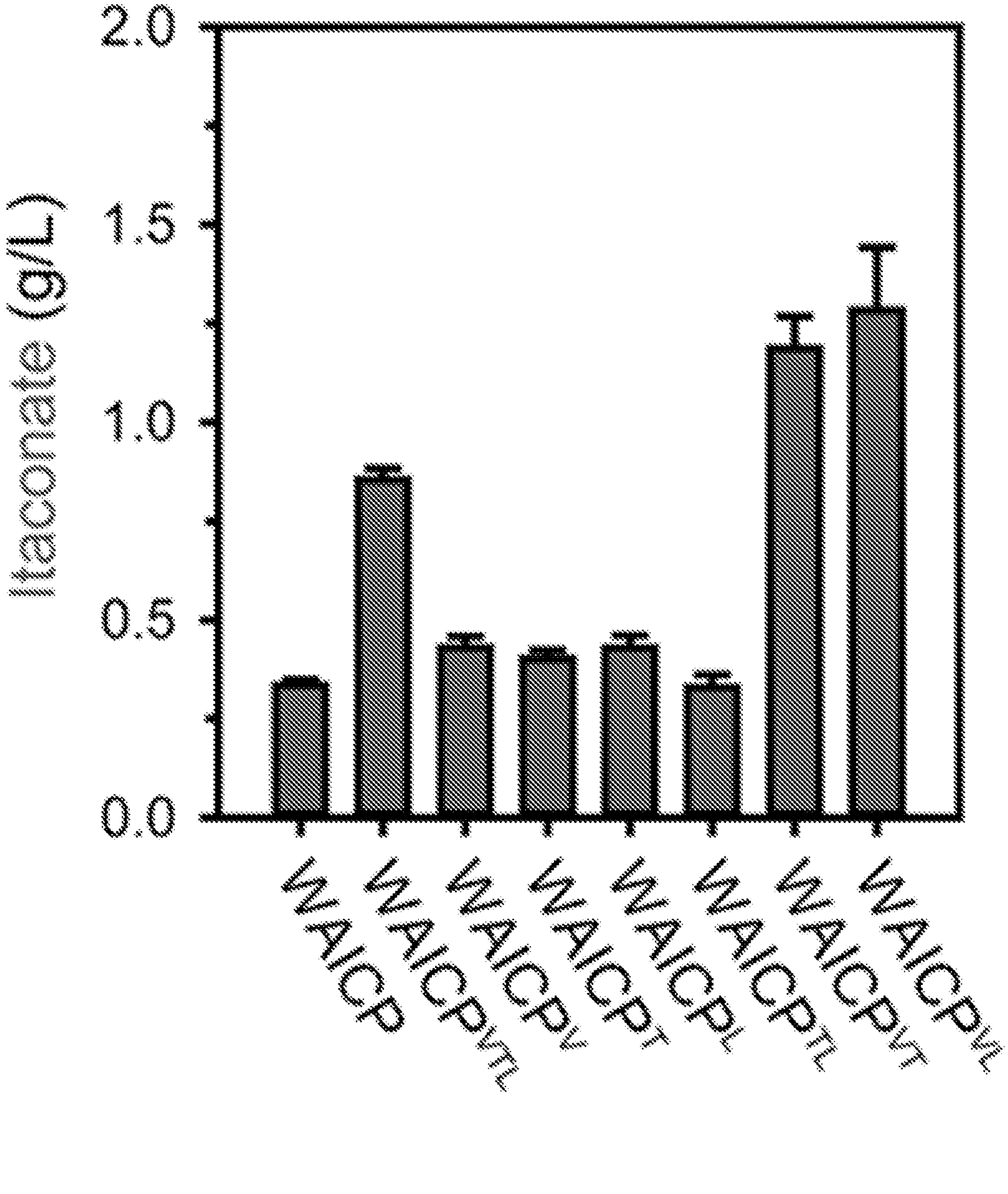

【Figure 5】
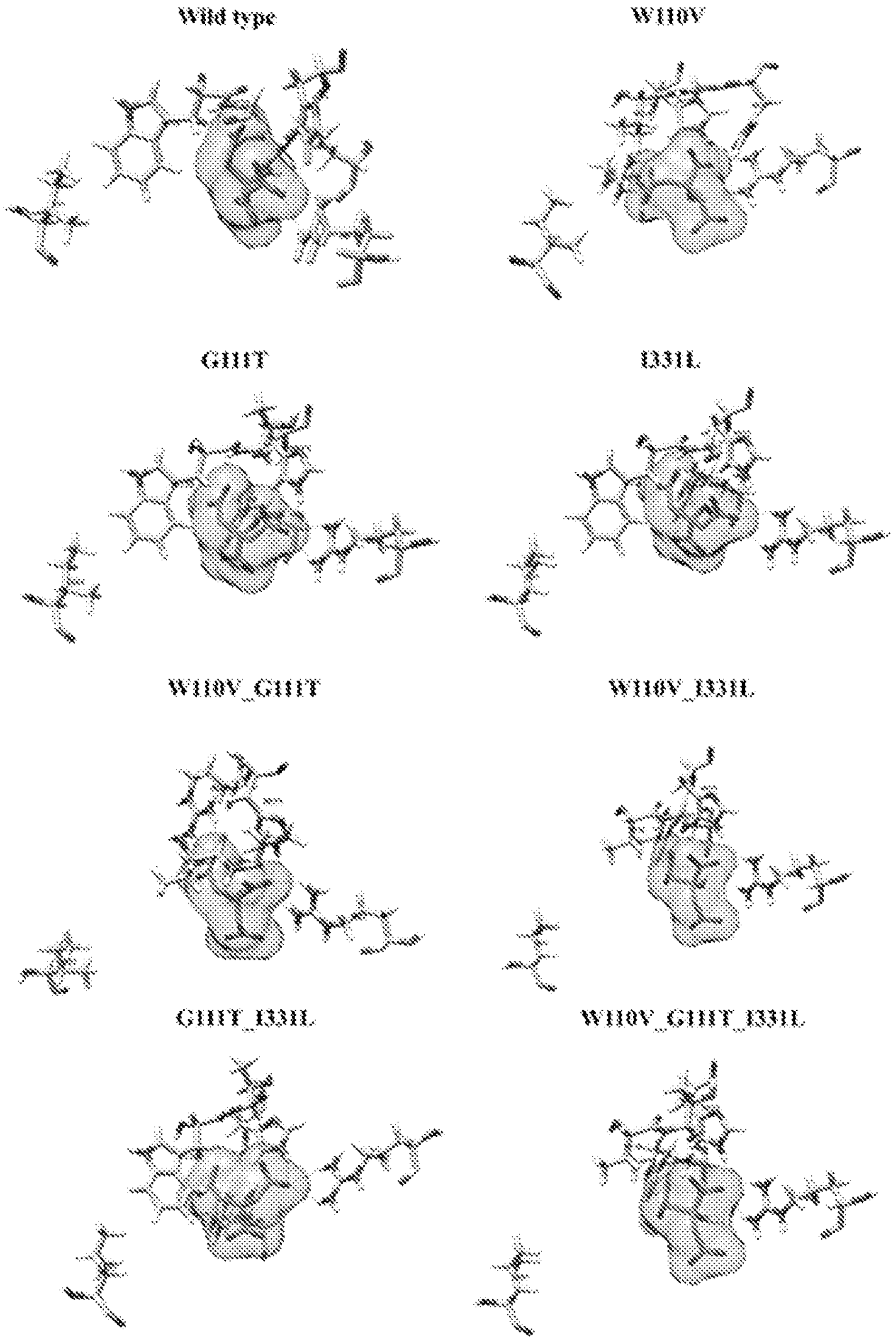

【Figure 6】
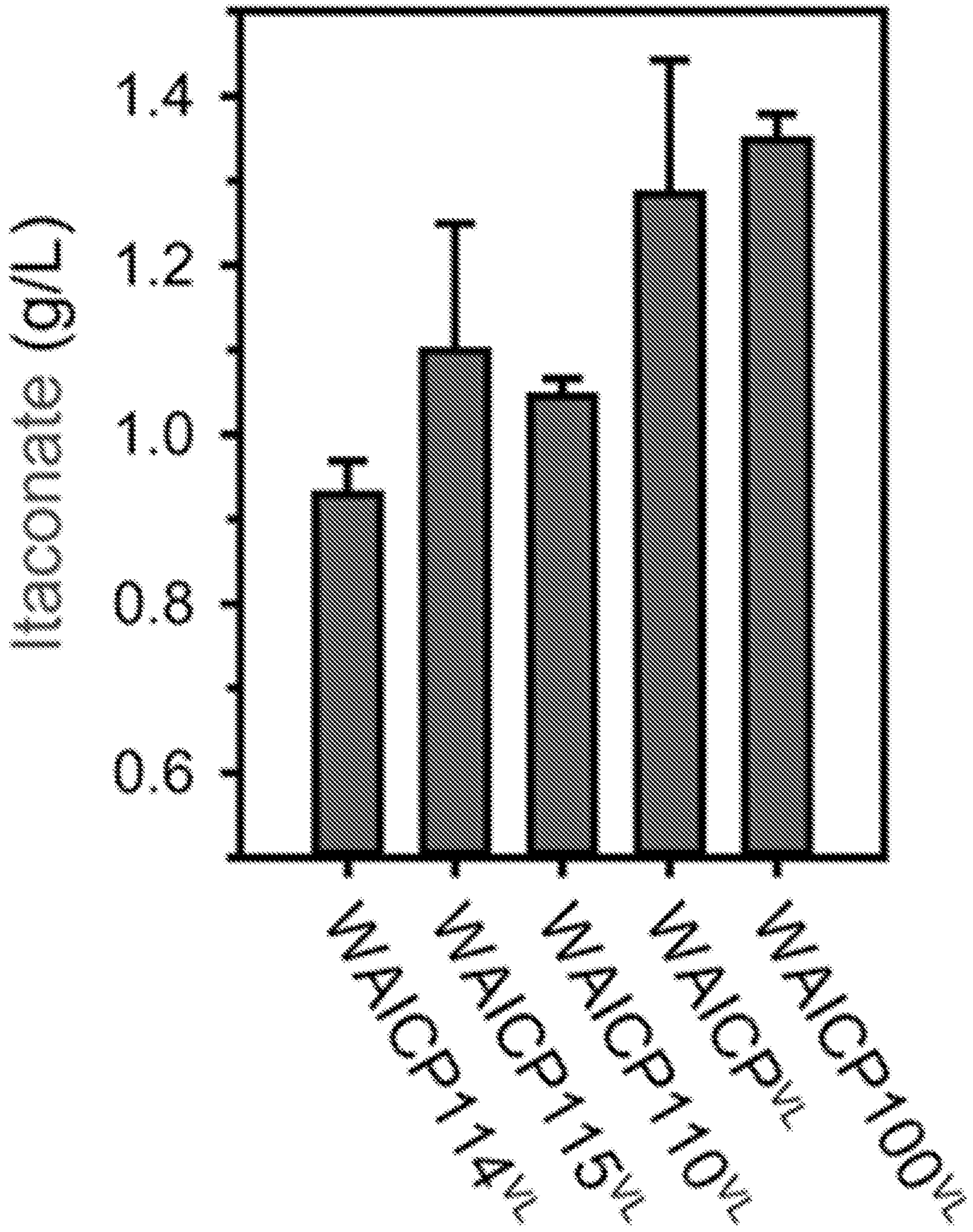

SEQUENCE LISTING

```
Sequence total quantity: 19
SEQ ID NO: 1            moltype = DNA  length = 1452
FEATURE                 Location/Qualifiers
source                  1..1452
                        mol_type = other DNA
                        note = PrpD VTL
                        organism = synthetic construct
SEQUENCE: 1
atgtcagctc aaatcaacaa catccgcccg gaatttgatc gtgaaatcgt tgatatcgtc  60
gattacgtca tgaactacga aatcagctct aaagtggcct acgacaccgc acattactgc  120
ctgctcgaca cgctcggctg cggtctggaa gctctcgaat acccggcctg taaaaaactg  180
ctggggccaa ttgttcccgg caccgtcgta cccaacggcg tgcgcgtccc cggaactcag  240
ttccagctcg accccgtcca ggcggcattt aacatcggcg cgatgatccg ctggctcgat  300
ttcaacgata cctggctggc ggcggaggtt actcatcctt ccgacaacct cggcggcatt  360
ctggcaacgg cggactggct ttcgcgcaac gcggtcgcca gcggcaaagc gccgttgacc  420
atgaaacagg tgctgaccgc aatgatcaaa gcccatgaaa ttcagggctg catcgcgctg  480
gaaaactcct ttaaccgcgt cggcctcgac cacgttctgt tagtgaaagt ggcttccacc  540
gccgtggtcg ccgaaatgct cggcctgacc cgcgaggaaa ttctcaacgc cgtttcgctg  600
gcgtgggtgg acggtcagtc gctgcgcacc tatcgccatg cgccgaacac cggcacgcgt  660
aaatcctggg cggcgggcga tgccacttcc cgcgcggtac gtctggcact gatggcgaaa  720
acgggcgaaa tgggttaccc gtcagcccta accgcgccgg tatggggctt ctacgacgtc  780
tcctttaaag gtgaatcgtt ccgcttccag cgtccgtacg gttcttacgt catggagaat  840
gtgctgttca aaatctcctt cccggcggag ttccactccc agacggcagt tgaagcggcg  900
atgacgctct atgaacagat gcaggcagca ggcaagacgg cggcggatat cgaaaaagtg  960
accattcgca cccacgaagc ctgtattcgc ctaatcgaca aaaaggggcc gctcaataac  1020
ccggctgacc gcgaccactg cattcagtac atggtggcga tcccgctgtt attcgggcgc  1080
ttaacggcgg cagattacga ggacaacgtt gcgcaagata aacgcatcga cgccctgcgc  1140
gagaagatca attgctttga agatccggca tttaccgctg actaccacga cccggaaaaa  1200
cgcgccatcg ccaatgccat tacccttgag ttcaccgacg gcacacgatt tgaagaagtg  1260
gtggtggagt accccattgg tcatgctcgc cgccgtcagg atggtattcc gaaactggtc  1320
gataaattca aaatcaatct cgcgcgccag ttcccgactc gccaacagca gcgcattctg  1380
gaggtttctc tcgacagaac tcgcctggaa cagatgccgg tcaatgagta tctcgacctg  1440
tacgtcattt aa                                                      1452

SEQ ID NO: 2            moltype = DNA  length = 1473
FEATURE                 Location/Qualifiers
source                  1..1473
                        mol_type = other DNA
                        note = Cad
                        organism = synthetic construct
SEQUENCE: 2
atgaccaaac agagcgcaga tagcaatgca aaaagcggtg ttaccagcga aatttgtcat  60
tgggcaagca atctggcaac cgatgatatt ccgagtgatg ttctggaacg tgccaaatat  120
ctgattctgg atggtattgc atgtgcatgg gttggtgcac gtgttccgtg gtcagaaaaa  180
tatgttcagg caaccatgag ctttgaaccg cctggtgcat gtcgtgttat tggttatggc  240
cagaaactgg gtccggttgc agcagcaatg accaatagcg catttattca ggccaccgaa  300
ctggatgatt atcatagcga agcaccgctg catagcgcaa gcattgttct gcctgcagtt  360
tttgcagcaa gcgaagttct ggcagaacag ggtaaaacca ttagcggtat tgatgttatt  420
ctggcagcca ttgttggttt tgaaagcggt ccgcgtattg gtaaagcaat ttatggtagc  480
gatctgctga ataatggttg gcattgtggt gcagtttatg gtgcaccggc aggcgcactg  540
gccaccggta aactgctggg tctgacaccg gatagcatgg aagatgcact gggtattgcc  600
tgtacccagg catgtggtct gatgagcgca cagtatggtg gtatggttaa acgtgttcag  660
```

-continued

```
catggttttg cagcccgtaa tggtctgctg ggtggcctgc tggcacatgg tggttatgaa  720
gcaatgaaag gtgtgctgga acgtagctat ggtggttttc tgaaaatgtt taccaaaggc  780
aatggtcgtg aacctccgta taaagaagaa gaagttgttg caggtctggg tagcttttgg  840
catacccttta ccattcgcat taaactgtat gcatgttgtg gtctggttca tggtccggtg  900
gaagcaattg aaaatctgca gggtcgttat ccggaactgc tgaatcgtgc aaatctgagc  960
aatattcgtc atgttcatgt tcagctgagc accgcaagca atagccattg cggttggatt  1020
ccggaagaac gtccgattag cagcattgca ggtcagatga gcgttgcata tattctggcc  1080
gttcagctgg ttgatcagca gtgtctgctg agccagttta gcgaatttga tgataacctg  1140
gaacgtccgg aagtttggga tctggcacgt aaagttacca gcagccagag cgaagaattt  1200
gatcaggatg gtaattgtct gagcgcaggt cgtgttcgta ttgaatttaa tgatggttcc  1260
agcattaccg aaagcgttga aaaaccgctg ggtgttaaag aaccgatgcc gaatgaacgt  1320
atcctgcata aatatcgtac cctggcaggt agcgttaccg atgaaagccg tgtgaaagaa  1380
attgaagatc tggttctggg tctggatcgt ctgaccgata ttagtccgct gctggaactg  1440
ctgaactgtc cggttaaaag tccgctggtt taa                              1473

SEQ ID NO: 3            moltype = DNA  length = 2598
FEATURE                 Location/Qualifiers
source                  1..2598
                        mol_type = other DNA
                        note = AcnB W482R
                        organism = synthetic construct
SEQUENCE: 3
gtgctagaag aataccgtaa gcacgtagct gagcgtgccg ctgaggggat tgcgcccaaa  60
cccctggatg caaaccaaat ggccgcactt gtagagctgc tgaaaaaccc gcccgcgggc  120
gaagaagaat tcctgttaga tctgttaacc aaccgtgttc cccctggcgt cgatgaagcc  180
gcctatgtca aagcaggctt cctggctgct atcgcgaaag gcgaagccaa atcccctctg  240
ctgactccgg aaaaagccat cgaactgctg ggcaccatgc agggtggtta caacattcat  300
ccgctgatcg acgcgctgga tgatgccaaa ctggcaccga tcgctgccaa agcactttct  360
cacacactgc tgatgttcga taacttctat gacgtagaag agaaagcgaa agcaggcaac  420
gaatatgcga agcaggtaat gcagtcctgg gcggatgccg aatggttcct gaatcgcccg  480
gtgctggctg aaaaactgac cgttaccgtc ttcaaagtca ctggcgaaac caacaccgat  540
gacctttctc cggcaccgga tgcgtggtcg cgcccggata tcccactgca cgcgctggcg  600
atgctgaaaa acgcccgtga aggtattgag ccagaccagc caggtgttgt tggcccgatc  660
aaacagattg aagctctgca acagaaaggt ttcccgctgg cgtacgtcgg tgacgttgtg  720
ggtacgggtt catcgcgtaa atccgccacg aactccgttc tgtggtttat gggcgatgat  780
attccacatg tgccgaacaa acgcggcggt ggtttgtgcc tcggcggtaa aattgcaccc  840
atcttcttta acacgatgga agacgcgggt gcactgccaa tcgaagtcga cgtctctaac  900
ctgaacatgg gcgacgtgat tgacgtttac ccgtacaaag gtgaagtgcg taaccacgaa  960
acaggcgaac tgctggcgac cttcgaactg aaaaccgacg tgctgattga tgaagtgcgt  1020
gctggcggcc gtatcccgct gattatcggg cgtggcctga ccaccaaagc gcgtgaagca  1080
cttggtctgc cgcacagtga tgtgttccgt caggcgaaag atgtcgctga gagcgatcgc  1140
ggcttctcgc tggcgcagaa aatggtaggc cgtgcctgtg gcgtgaaagg cattcgtccg  1200
ggcgcgtact gcgaaccgaa aatgacttct gtaggctctc aggacaccac cggcccgatg  1260
acccgtgatg aactgaaaga cctggcgtgc ctgggcttct cggctgacct ggtgatgcag  1320
tctttctgcc acaccgcggc gtatccgaag ccagttgacg tgaacacgca ccacacgctg  1380
ccggacttca ttatgaaccg tggcggtgtg tcgctgcgtc cgggtgacgg cgtcattcac  1440
tcccggctga accgtatgct gctgccggat accgtcggta ccggtggtga ttcccatacc  1500
cgtttcccga tcggtatctc tttcccggcg ggttctggtc tggtggcatt tgcagccgca  1560
acaggcgtaa tgccgctgga tatgccggaa tccgttctgg tgcgcttcaa aggcaaaatg  1620
cagccgggca tcaccctgcg cgatctggta catgccattc cgctgtatgc gatcaaacaa  1680
ggtctgctga ccgttgagaa gaaaggcaag aaaaacatct tctctggccg catcctggaa  1740
attgaaggtc tgccggatct gaaagttgag caggcatttg aactgaccga tgcgtccgcc  1800
gagcgttctg ccgctggttg taccatcaag ctgaacaaag aaccgatcat cgaatacctg  1860
aactctaaca tcgtcctgct gaagtggatg atcgcggaag gttacggcga tcgtcgcacc  1920
ctggaacgtc gtattcaggg catggaaaaa tggctggcga atcctgagct gctggaagcc  1980
gatgcagatg ctgaatacgc ggcagtgatc gacatcgatc tggcggatat taaagagcca  2040
atcctctgtg caccgaacga cccggatgac gcgcgtccgc tgtctgcggt acagggtgag  2100
aagatcgacg aagtatttat cggttcctgc atgaccaaca tcggtcactt ccgtgctgcg  2160
ggtaaactgc tggatgcgca caaaggccaa ctgccgaccc gcctgtgggt ggcaccgcca  2220
acccgtatgg acgccgcgca gttgactgaa gaaggctact acagcgtctt cggtaagagt  2280
ggtgcgcgta tcgagatccc gggctgttct ctgtgtatgg gtaaccaggc gcgtgtagca  2340
gacggtgcga cggtggtttc cacctctacc cgtaacttcc cgaaccgtct gggtactggc  2400
gcgaatgtct tcctggcttc tgcggaactg gcggctgttg cggcgctgat tggcaaactg  2460
ccgacgccgg aagagtacca gacctacgtg gcgcaagtag ataaaactgc cgttgatact  2520
tatcgttatc tgaacttcaa ccagctttct cagtacaccg aaaaagccga tggggtgatt  2580
ttccagactg cggtgtaa                                               2598

SEQ ID NO: 4            moltype = DNA  length = 825
FEATURE                 Location/Qualifiers
source                  1..825
                        mol_type = other DNA
                        note = iclR
                        organism = synthetic construct
SEQUENCE: 4
atggtcgcac ccattcccgc gaaacgcggc agaaaacccg ccgttgccac cgcaccagcg  60
actggacagg ttcagtcttt aacgcgtggc ctgaaattac tggagtggat tgccgaatcc  120
aatggcagtg tggcactcac agagctggcg caacaagccg ggttacccaa ttccacgacc  180
caccgcctgc taaccacgat gcaacagcag ggtttcgtgc gtcaggtcgg cgaactggga  240
cattgggcaa tcggcgcaca tgcctttatg gtcggcagca gctttctcca gagccgtaat  300
```

-continued

```
ttgttagcga ttgttcaccc tatcctgcgc aatttaatgg aagagtctgg cgaaacggtc  360
aatatggcgg tgcttgatca aagcgatcac gaagcgatta ttatcgacca ggtacagtgt  420
acgcatctga tgcgaatgtc cgcgcctatc ggcggtaaat tgccgatgca cgcttccggt  480
gcgggtaaag cctttttagc ccaactgagc gaagaacagg tgacgaagct gctgcaccgc  540
aaagggttac atgcctatac ccacgcaacg ctggtgtctc ctgtgcattt aaaagaagat  600
ctcgcccaaa cgcgcaaacg gggttattca tttgacgatg aggaacatgc actggggcta  660
cgttgccttg cagcgtgtat tttcgatgag caccgcgaac cgtttgccgc aatttcaatt  720
tccggaccga tttcacgtat taccgatgac cgcgtgaccg agtttggcgc gatggtgatt  780
aaagcggcga aggaagtgac gctggcgtac ggtggaatgc gctga                825

SEQ ID NO: 5            moltype = DNA  length = 29
FEATURE                 Location/Qualifiers
source                  1..29
                        mol_type = other DNA
                        note = Tac promoter
                        organism = synthetic construct
SEQUENCE: 5
ttgacaatta atcatcggct cgtataatg                                   29

SEQ ID NO: 6            moltype = DNA  length = 35
FEATURE                 Location/Qualifiers
source                  1..35
                        mol_type = other DNA
                        note = J23108 promoter
                        organism = synthetic construct
SEQUENCE: 6
ctgacagcta gctcagtcct aggtataatg ctagc                            35

SEQ ID NO: 7            moltype = DNA  length = 1452
FEATURE                 Location/Qualifiers
source                  1..1452
                        mol_type = other DNA
                        note = PrpD V
                        organism = synthetic construct
SEQUENCE: 7
atgtcagctc aaatcaacaa catccgcccg gaatttgatc gtgaaatcgt tgatatcgtc  60
gattacgtca tgaactacga aatcagctct aaagtggcct acgacaccgc acattactgc  120
ctgctcgaca cgctcggctg cggtctggaa gctctcgaat acccggcctg taaaaaactg  180
ctggggccaa ttgttcccgg caccgtcgta cccaacggcg tgcgcgtccc cggaactcag  240
ttccagctcg accccgtcca ggcggcattt aacatcggcg cgatgatccg ctggctcgat  300
ttcaacgata cctggctggc ggcggaggtt ggccatcctt ccgacaacct cggcggcatt  360
ctggcaacgg cggactggct ttcgcgcaac gcggtcgcca gcggcaaagc gccgttgacc  420
atgaaacagg tgctgaccgc aatgatcaaa gcccatgaaa ttcagggctg catcgcgctg  480
gaaaactcct ttaaccgcgt cggcctcgac cacgttctgt tagtgaaagt ggcttccacc  540
gccgtggtcg ccgaaatgct cggcctgacc cgcgaggaaa ttctcaacgc cgtttcgctg  600
gcgtgggtgg acggtcagtc gctgcgcacc tatcgccatg cgccgaacac cggcacgcgt  660
aaatcctggg cggcgggcga tgccacttcc cgcgcggtac gtctggcact gatggcgaaa  720
acgggcgaaa tgggttaccc gtcagcccta accgcgccgg tatggggctt ctacgacgtc  780
tcctttaaag gtgaatcgtt ccgcttccag cgtccgtacg gttcttacgt catggagaat  840
gtgctgttca aaatctcctt cccggcggag ttccactccc agacggcagt tgaagcggcg  900
atgacgctct atgaacagat gcaggcagca ggcaagacgg cggcggatat cgaaaaagtg  960
accattcgca cccacgaagc ctgtattcgc atcatcgaca aaaaggggcc gctcaataac  1020
ccggctgacc gcgaccactg cattcagtac atggtggcga tcccgctgtt attcgggcgc  1080
ttaacggcgg cagattacga ggacaacgtt gcgcaagata aacgcatcga cgccctgcgc  1140
gagaagatca attgctttga agatccggca tttaccgctg actaccacga cccggaaaaa  1200
cgcgccatcg ccaatgccat taccttgag ttcaccgacg gcacacgatt tgaagaagtg  1260
gtggtggagt accccattgg tcatgctcgc cgccgtcagg atggtattcc gaaactggtc  1320
gataaattca aaatcaatct cgcgcgccag ttcccgactc gccaacagca gcgcattctg  1380
gaggtttctc tcgacagaac tcgcctggaa cagatgccgg tcaatgagta tctcgacctg  1440
tacgtcattt aa                                                     1452

SEQ ID NO: 8            moltype = DNA  length = 1452
FEATURE                 Location/Qualifiers
source                  1..1452
                        mol_type = other DNA
                        note = PrpD T
                        organism = synthetic construct
SEQUENCE: 8
atgtcagctc aaatcaacaa catccgcccg gaatttgatc gtgaaatcgt tgatatcgtc  60
gattacgtca tgaactacga aatcagctct aaagtggcct acgacaccgc acattactgc  120
ctgctcgaca cgctcggctg cggtctggaa gctctcgaat acccggcctg taaaaaactg  180
ctggggccaa ttgttcccgg caccgtcgta cccaacggcg tgcgcgtccc cggaactcag  240
ttccagctcg accccgtcca ggcggcattt aacatcggcg cgatgatccg ctggctcgat  300
ttcaacgata cctggctggc ggcggagtgg actcatcctt ccgacaacct cggcggcatt  360
ctggcaacgg cggactggct ttcgcgcaac gcggtcgcca gcggcaaagc gccgttgacc  420
atgaaacagg tgctgaccgc aatgatcaaa gcccatgaaa ttcagggctg catcgcgctg  480
gaaaactcct ttaaccgcgt cggcctcgac cacgttctgt tagtgaaagt ggcttccacc  540
gccgtggtcg ccgaaatgct cggcctgacc cgcgaggaaa ttctcaacgc cgtttcgctg  600
gcgtgggtgg acggtcagtc gctgcgcacc tatcgccatg cgccgaacac cggcacgcgt  660
```

aaatcctggg cggcgggcga tgccacttcc cgcgcggtac gtctggcact gatggcgaaa 720
acgggcgaaa tgggttaccc gtcagcccta accgcgccgg tatggggctt ctacgacgtc 780
tcctttaaag gtgaatcgtt ccgcttccag cgtccgtacg gttcttacgt catggagaat 840
gtgctgttca aaatctcctt cccggcggag ttccactccc agacggcagt tgaagcggcg 900
atgacgctct atgaacagat gcaggcagca ggcaagacgg cggcggatat cgaaaaagtg 960
accattcgca cccacgaagc ctgtattcgc atcatcgaca aaaaggggcc gctcaataac 1020
ccggctgacc gcgaccactg cattcagtac atggtggcga tcccgctgtt attcgggcgc 1080
ttaacggcgg cagattacga ggacaacgtt gcgcaagata aacgcatcga cgccctgcgc 1140
gagaagatca attgctttga agatccggca tttaccgctg actaccacga cccggaaaaa 1200
cgcgccatcg ccaatgccat tacccttgag ttcaccgacg gcacacgatt tgaagaagtg 1260
gtggtggagt accccattgg tcatgctcgc cgccgtcagg atggtattcc gaaactggtc 1320
gataaattca aatcaatctt cgcgcgccag ttcccgactc gccaacagca gcgcattctg 1380
gaggtttctc tcgacagaac tcgcctggaa cagatgccgg tcaatgagta tctcgacctg 1440
tacgtcattt aa 1452

SEQ ID NO: 9 moltype = DNA length = 1452
FEATURE Location/Qualifiers
source 1..1452
mol_type = other DNA
note = PrpD L
organism = synthetic construct
SEQUENCE: 9
atgtcagctc aaatcaacaa catccgcccg gaatttgatc gtgaaatcgt tgatatcgtc 60
gattacgtca tgaactacga aatcagctct aaagtggcct acgacaccgc acattactgc 120
ctgctcgaca cgctcggctg cggtctggaa gctctcgaat acccggcctg taaaaaactg 180
ctggggccaa ttgttcccgg caccgtcgta cccaacggcg tgcgcgtccc cggaactcag 240
ttccagctcg accccgtcca ggcggcattt aacatcggcg cgatgatccg ctggctcgat 300
ttcaacgata cctggctggc ggcggagtgg ggccatcctt ccgacaacct cggcggcatt 360
ctggcaacgg cggactggct ttcgcgcaac gcggtcgcca gcggcaaagc gccgttgacc 420
atgaaacagg tgctgaccgc aatgatcaaa gcccatgaaa ttcagggctg catcgcgctg 480
gaaaactcct ttaaccgcgt cggcctcgac cacgttctgt tagtgaaagt ggcttccacc 540
gccgtggtcg ccgaaatgct cggcctgacc cgcgaggaaa ttctcaacgc cgtttcgctg 600
gcgtgggtgg acggtcagtc gctgcgcacc tatcgccatg cgccgaacac cggcacgcgt 660
aaatcctggg cggcgggcga tgccacttcc cgcgcggtac gtctggcact gatggcgaaa 720
acgggcgaaa tgggttaccc gtcagcccta accgcgccgg tatggggctt ctacgacgtc 780
tcctttaaag gtgaatcgtt ccgcttccag cgtccgtacg gttcttacgt catggagaat 840
gtgctgttca aaatctcctt cccggcggag ttccactccc agacggcagt tgaagcggcg 900
atgacgctct atgaacagat gcaggcagca ggcaagacgg cggcggatat cgaaaaagtg 960
accattcgca cccacgaagc ctgtattcgc ctaatcgaca aaaaggggcc gctcaataac 1020
ccggctgacc gcgaccactg cattcagtac atggtggcga tcccgctgtt attcgggcgc 1080
ttaacggcgg cagattacga ggacaacgtt gcgcaagata aacgcatcga cgccctgcgc 1140
gagaagatca attgctttga agatccggca tttaccgctg actaccacga cccggaaaaa 1200
cgcgccatcg ccaatgccat tacccttgag ttcaccgacg gcacacgatt tgaagaagtg 1260
gtggtggagt accccattgg tcatgctcgc cgccgtcagg atggtattcc gaaactggtc 1320
gataaattca aatcaatctt cgcgcgccag ttcccgactc gccaacagca gcgcattctg 1380
gaggtttctc tcgacagaac tcgcctggaa cagatgccgg tcaatgagta tctcgacctg 1440
tacgtcattt aa 1452

SEQ ID NO: 10 moltype = DNA length = 1452
FEATURE Location/Qualifiers
source 1..1452
mol_type = other DNA
note = PrpD TL
organism = synthetic construct
SEQUENCE: 10
atgtcagctc aaatcaacaa catccgcccg gaatttgatc gtgaaatcgt tgatatcgtc 60
gattacgtca tgaactacga aatcagctct aaagtggcct acgacaccgc acattactgc 120
ctgctcgaca cgctcggctg cggtctggaa gctctcgaat acccggcctg taaaaaactg 180
ctggggccaa ttgttcccgg caccgtcgta cccaacggcg tgcgcgtccc cggaactcag 240
ttccagctcg accccgtcca ggcggcattt aacatcggcg cgatgatccg ctggctcgat 300
ttcaacgata cctggctggc ggcggagtgg actcatcctt ccgacaacct cggcggcatt 360
ctggcaacgg cggactggct ttcgcgcaac gcggtcgcca gcggcaaagc gccgttgacc 420
atgaaacagg tgctgaccgc aatgatcaaa gcccatgaaa ttcagggctg catcgcgctg 480
gaaaactcct ttaaccgcgt cggcctcgac cacgttctgt tagtgaaagt ggcttccacc 540
gccgtggtcg ccgaaatgct cggcctgacc cgcgaggaaa ttctcaacgc cgtttcgctg 600
gcgtgggtgg acggtcagtc gctgcgcacc tatcgccatg cgccgaacac cggcacgcgt 660
aaatcctggg cggcgggcga tgccacttcc cgcgcggtac gtctggcact gatggcgaaa 720
acgggcgaaa tgggttaccc gtcagcccta accgcgccgg tatggggctt ctacgacgtc 780
tcctttaaag gtgaatcgtt ccgcttccag cgtccgtacg gttcttacgt catggagaat 840
gtgctgttca aaatctcctt cccggcggag ttccactccc agacggcagt tgaagcggcg 900
atgacgctct atgaacagat gcaggcagca ggcaagacgg cggcggatat cgaaaaagtg 960
accattcgca cccacgaagc ctgtattcgc ctaatcgaca aaaaggggcc gctcaataac 1020
ccggctgacc gcgaccactg cattcagtac atggtggcga tcccgctgtt attcgggcgc 1080
ttaacggcgg cagattacga ggacaacgtt gcgcaagata aacgcatcga cgccctgcgc 1140
gagaagatca attgctttga agatccggca tttaccgctg actaccacga cccggaaaaa 1200
cgcgccatcg ccaatgccat tacccttgag ttcaccgacg gcacacgatt tgaagaagtg 1260
gtggtggagt accccattgg tcatgctcgc cgccgtcagg atggtattcc gaaactggtc 1320
gataaattca aatcaatctt cgcgcgccag ttcccgactc gccaacagca gcgcattctg 1380
gaggtttctc tcgacagaac tcgcctggaa cagatgccgg tcaatgagta tctcgacctg 1440

```
tacgtcattt aa                                                      1452

SEQ ID NO: 11          moltype = DNA  length = 1452
FEATURE                Location/Qualifiers
source                 1..1452
                       mol_type = other DNA
                       note = PrpD VT
                       organism = synthetic construct
SEQUENCE: 11
atgtcagctc aaatcaacaa catccgcccg gaatttgatc gtgaaatcgt tgatatcgtc  60
gattacgtca tgaactacga aatcagctct aaagtggcct acgacaccgc acattactgc  120
ctgctcgaca cgctcggctg cggtctggaa gctctcgaat acccggcctg taaaaaactg  180
ctggggccaa ttgttcccgg caccgtcgta cccaacggcg tgcgcgtccc cggaactcag  240
ttccagctcg accccgtcca ggcggcattt aacatcggcg cgatgatccg ctggctcgat  300
ttcaacgata cctggctggc ggcggaggtt actcatcctt ccgacaacct cggcggcatt  360
ctggcaacgg cggactggct ttcgcgcaac gcggtcgcca gcggcaaagc gccgttgacc  420
atgaaacagg tgctgaccgc aatgatcaaa gcccatgaaa ttcagggctg catcgcgctg  480
gaaaactcct ttaaccgcgt cggcctcgac cacgttctgt tagtgaaagt ggcttccacc  540
gccgtggtcg ccgaaatgct cggcctgacc cgcgaggaaa ttctcaacgc cgtttcgctg  600
gcgtgggtgg acggtcagtc gctgcgcacc tatcgccatg cgccgaacac cggcacgcgt  660
aaatcctggg cggcgggcga tgccacttcc cgcgcggtac gtctggcact gatggcgaaa  720
acgggcgaaa tgggttaccc gtcagcccta accgcgccgg tatggggctt ctacgacgtc  780
tcctttaaag gtgaatcgtt ccgcttccag cgtccgtacg gttcttacgt catggagaat  840
gtgctgttca aaatctcctt cccggcggag ttccactccc agacggcagt tgaagcggcg  900
atgacgctct atgaacagat gcaggcagca ggcaagacgg cggcggatat cgaaaaagtg  960
accattcgca cccacgaagc ctgtattcgc atcatcgaca aaaaggggcc gctcaataac  1020
ccggctgacc gcgaccactg cattcagtac atggtggcga tcccgctgtt attcgggcgc  1080
ttaacggcgg cagattacga ggacaacgtt gcgcaagata aacgcatcga cgccctgcgc  1140
gagaagatca attgctttga agatccggca tttaccgctg actaccacga cccggaaaaa  1200
cgcgccatcg ccaatgccat tacccttgag ttcaccgacg gcacacgatt tgaagaagtg  1260
gtggtggagt accccattgg tcatgctcgc cgccgtcagg atggtattcc gaaactggtc  1320
gataaattca aaatcaatct cgcgcgccag ttcccgactc gccaacagca gcgcattctg  1380
gaggtttctc tcgacagaac tcgcctggaa cagatgccgg tcaatgagta tctcgacctg  1440
tacgtcattt aa                                                      1452

SEQ ID NO: 12          moltype = DNA  length = 1452
FEATURE                Location/Qualifiers
source                 1..1452
                       mol_type = other DNA
                       note = PrpD VL
                       organism = synthetic construct
SEQUENCE: 12
atgtcagctc aaatcaacaa catccgcccg gaatttgatc gtgaaatcgt tgatatcgtc  60
gattacgtca tgaactacga aatcagctct aaagtggcct acgacaccgc acattactgc  120
ctgctcgaca cgctcggctg cggtctggaa gctctcgaat acccggcctg taaaaaactg  180
ctggggccaa ttgttcccgg caccgtcgta cccaacggcg tgcgcgtccc cggaactcag  240
ttccagctcg accccgtcca ggcggcattt aacatcggcg cgatgatccg ctggctcgat  300
ttcaacgata cctggctggc ggcggaggtt ggccatcctt ccgacaacct cggcggcatt  360
ctggcaacgg cggactggct ttcgcgcaac gcggtcgcca gcggcaaagc gccgttgacc  420
atgaaacagg tgctgaccgc aatgatcaaa gcccatgaaa ttcagggctg catcgcgctg  480
gaaaactcct ttaaccgcgt cggcctcgac cacgttctgt tagtgaaagt ggcttccacc  540
gccgtggtcg ccgaaatgct cggcctgacc cgcgaggaaa ttctcaacgc cgtttcgctg  600
gcgtgggtgg acggtcagtc gctgcgcacc tatcgccatg cgccgaacac cggcacgcgt  660
aaatcctggg cggcgggcga tgccacttcc cgcgcggtac gtctggcact gatggcgaaa  720
acgggcgaaa tgggttaccc gtcagcccta accgcgccgg tatggggctt ctacgacgtc  780
tcctttaaag gtgaatcgtt ccgcttccag cgtccgtacg gttcttacgt catggagaat  840
gtgctgttca aaatctcctt cccggcggag ttccactccc agacggcagt tgaagcggcg  900
atgacgctct atgaacagat gcaggcagca ggcaagacgg cggcggatat cgaaaaagtg  960
accattcgca cccacgaagc ctgtattcgc ctaatcgaca aaaaggggcc gctcaataac  1020
ccggctgacc gcgaccactg cattcagtac atggtggcga tcccgctgtt attcgggcgc  1080
ttaacggcgg cagattacga ggacaacgtt gcgcaagata aacgcatcga cgccctgcgc  1140
gagaagatca attgctttga agatccggca tttaccgctg actaccacga cccggaaaaa  1200
cgcgccatcg ccaatgccat tacccttgag ttcaccgacg gcacacgatt tgaagaagtg  1260
gtggtggagt accccattgg tcatgctcgc cgccgtcagg atggtattcc gaaactggtc  1320
gataaattca aaatcaatct cgcgcgccag ttcccgactc gccaacagca gcgcattctg  1380
gaggtttctc tcgacagaac tcgcctggaa cagatgccgg tcaatgagta tctcgacctg  1440
tacgtcattt aa                                                      1452

SEQ ID NO: 13          moltype = DNA  length = 35
FEATURE                Location/Qualifiers
source                 1..35
                       mol_type = other DNA
                       note = J23115 promoter
                       organism = synthetic construct
SEQUENCE: 13
tttatagcta gctcagccct tggtacaatg ctagc                             35

SEQ ID NO: 14          moltype = DNA  length = 35
FEATURE                Location/Qualifiers
```

```
source                  1..35
                        mol_type = other DNA
                        note = J23114 promoter
                        organism = synthetic construct
SEQUENCE: 14
tttatggcta gctcagtcct aggtacaatg ctagc                              35

SEQ ID NO: 15           moltype = DNA  length = 35
FEATURE                 Location/Qualifiers
source                  1..35
                        mol_type = other DNA
                        note = J23110 promoter
                        organism = synthetic construct
SEQUENCE: 15
tttacggcta gctcagtcct aggtacaatg ctagc                              35

SEQ ID NO: 16           moltype = DNA  length = 35
FEATURE                 Location/Qualifiers
source                  1..35
                        mol_type = other DNA
                        note = J23100 promoter
                        organism = synthetic construct
SEQUENCE: 16
ttgacggcta gctcagtcct aggtacagtg ctagc                              35

SEQ ID NO: 17           moltype = DNA  length = 1452
FEATURE                 Location/Qualifiers
source                  1..1452
                        mol_type = other DNA
                        note = PrpD wild type
                        organism = synthetic construct
SEQUENCE: 17
atgtcagctc aaatcaacaa catccgcccg gaatttgatc gtgaaatcgt tgatatcgtc  60
gattacgtca tgaactacga aatcagctct aaagtggcct acgacaccgc acattactgc  120
ctgctcgaca cgctcggctg cggtctggaa gctctcgaat acccggcctg taaaaaactg  180
ctggggccaa ttgttcccgg caccgtcgta cccaacggcg tgcgcgtccc cggaactcag  240
ttccagctcg accccgtcca ggcggcattt aacatcggcg cgatgatccg ctggctcgat  300
ttcaacgata cctggctggc ggcggagtgg ggccatcctt ccgacaacct cggcggcatt  360
ctggcaacgg cggactggct ttcgcgcaac gcggtcgcca gcggcaaagc gccgttgacc  420
atgaaacagg tgctgaccgc aatgatcaaa gcccatgaaa ttcagggctg catcgcgctg  480
gaaaactcct ttaaccgcgt cggcctcgac cacgttctgt tagtgaaagt ggcttccacc  540
gccgtggtcg ccgaaatgct cggcctgacc cgcgaggaaa ttctcaacgc cgtttcgctg  600
gcgtgggtgg acggtcagtc gctgcgcacc tatcgccatg cgccgaacac cggcacgcgt  660
aaatcctggg cggcgggcga tgccacttcc cgcgcggtac gtctggcact gatggcgaaa  720
acgggcgaaa tgggttaccc gtcagcccta accgcgccgg tatggggctt ctacgacgtc  780
tcctttaaag gtgaatcgtt ccgcttccag cgtccgtacg gttcttacgt catggagaat  840
gtgctgttca aaatctcctt cccggcggag ttccactccc agacggcagt tgaagcggcg  900
atgacgctct atgaacagat gcaggcagca ggcaagacgg cggcggatat cgaaaaagtg  960
accattcgca cccacgaagc ctgtattcgc atcatcgaca aaaaggggcc gctcaataac  1020
ccggctgacc gcgaccactg cattcagtac atggtggcga tcccgctgtt attcgggcgc  1080
ttaacggcgg cagattacga ggacaacgtt gcgcaagata aacgcatcga cgccctgcgc  1140
gagaagatca attgctttga agatccggca tttaccgctg actaccacga cccggaaaaa  1200
cgcgccatcg ccaatgccat tacccttgag ttcaccgacg gcacacgatt tgaagaagtg  1260
gtggtggagt accccattgg tcatgctcgc cgccgtcagg atggtattcc gaaactggtc  1320
gataaattca aaatcaatct cgcgcgccag ttcccgactc gccaacagca gcgcattctg  1380
gaggtttctc tcgacagaac tcgcctggaa cagatgccgg tcaatgagta tctcgacctg  1440
tacgtcattt aa                                                       1452

SEQ ID NO: 18           moltype = DNA  length = 25
FEATURE                 Location/Qualifiers
source                  1..25
                        mol_type = other DNA
                        note = synthetic 5' UTR (Cad)
                        organism = synthetic construct
SEQUENCE: 18
aaaaaaaaca aaaggagcat caccc                                         25

SEQ ID NO: 19           moltype = DNA  length = 25
FEATURE                 Location/Qualifiers
source                  1..25
                        mol_type = other DNA
                        note = synthetic 5' UTR (PrpD)
                        organism = synthetic construct
SEQUENCE: 19
caacaaaaaa aaaggagcat cctac                                         25
```

CIS-ACONITATE SYNTHESIS ENZYME AND USES THEREOF

CROSS-REFERENCE TO RELATED APPLICATIONS

This application is based on and claims priority from Korean Patent Application No. 10-2022-0042345 filed on Apr. 5, 2022 and Application No. 10-2022-01895874 filed on Dec. 29, 2022 with the Korean Intellectual Property Office, the disclosure of which is incorporated herein in its entirety by reference.

REFERENCE TO AN ELECTRONIC SEQUENCE LISTING

The contents of the electronic sequence listing (JPG20232077US_SEQ.xml; Size: 37 K bytes; and Date of Creation: Mar. 28, 2023) is herein incorporated by reference in its entirety.

TECHNICAL FIELD

The present disclosure relates to a novel cis-aconitate synthesis enzyme, and more particularly, to a recombinant microorganism for producing itaconate including a cis-aconitate synthesis enzyme variant.

BACKGROUND

Itaconate (itaconic acid), dicarboxylic acid composed of 5 carbons, is a material that may be used as precursors of various polymer materials such as latex and plastics, drug transport, and water purification based on structural characteristics of the material. Due to great industrial potential, the itaconate was selected as one of 12 bio-based platform chemicals selected by the United States Department of Energy in 2004.

In the case of itaconate, there is a case of *Aspergillus terreus*, which produces naturally the itaconate, but in *Aspergillus terreus*, genetic manipulation is difficult due to relatively insufficient genetic manipulation tools, and there are still limitations in mass production due to difficult fermentation conditions due to the characteristics of filamentous fungi. As an alternative, a study to establish a recombinant microorganism for efficient production of itaconate in the form of introducing cis-aconitate decarboxylase (Cad) derived from *Aspergillus terreus* using *Escherichia coli*, one of the industrial strains has been actively conducted.

However, the production of itaconate through recombinant *E. coli* has been limited in that enzyme expression and activity are reduced when heterologous expression occurs, and that cis-aconitate, a precursor of itaconate and an intermediate in a TCA cycle, is hardly accumulated in *E. coli.*

SUMMARY

Accordingly, in order to solve the problems of the related art as described above, the present inventors have developed a novel cis-aconitate synthesis enzyme through an evolutionary design rather than existing enzymes with respect to the synthesis of cis-aconitate, an intermediate in the TCA cycle to intend to increase the efficiency of itaconate synthesis by separating existing competing TCA cycle and itaconate synthesis according to the activity of the novel enzyme. In addition, the present inventors confirmed that a recombinant microorganism introduced with the enzyme responsible for the biosynthetic reaction had excellent itaconate production capacity and then completed the present disclosure.

The present disclosure has been made in an effort to provide an expression cassette for introducing an itaconate production pathway including a 2-methylcitrate dehydratase (PrpD) gene represented by at least one nucleotide sequence selected from the group consisting of SEQ ID NOs: 1, 7 to 12, and 17.

The present disclosure has also been made in an effort to provide a recombinant vector for producing an itaconate production pathway including the expression cassette.

The present disclosure has also been made in an effort to provide a recombinant microorganism for producing itaconate into which a PrpD gene represented by at least one nucleotide sequence selected from the group consisting of SEQ ID NOs: 1, 7 to 12, and 17 is introduced.

The present disclosure has also been made in an effort to provide a method for producing itaconate including culturing a recombinant microorganism for producing itaconate.

An embodiment of the present disclosure provides an expression cassette for introducing an itaconate production pathway including a PrpD gene represented by at least one nucleotide sequence selected from the group consisting of SEQ ID NOs: 1, 7 to 12, and 17.

Another embodiment of the present disclosure provides a recombinant vector for producing itaconate including the expression cassette for introducing the itaconate production pathway.

Yet another embodiment of the present disclosure provides a recombinant microorganism for producing itaconate into which a PrpD gene represented by at least one nucleotide sequence selected from the group consisting of SEQ ID NOs: 1, 7 to 12, and 17 is introduced.

Still another embodiment of the present disclosure provides a method for producing itaconate including culturing a recombinant microorganism for producing itaconate.

According to the embodiment of the present disclosure, it was confirmed that the production and yield of itaconate were significantly increased in the recombinant microorganism for producing itaconate into which the novel cis-aconitate synthesis enzyme was introduced. In addition, it was confirmed that in the recombinant microorganism for producing itaconate of the present disclosure, a new carbon flow to itaconate was separated from the existing TCA cycle based on the activity of the corresponding enzyme. Accordingly, the novel aconitate synthesis enzyme of the present disclosure and the recombinant microorganism introduced with the aconitate synthesis enzyme can increase the economic feasibility of itaconate, and thus can be used in various industrial fields, such as synthetic resins, latexes, and food additives in which itaconate is used.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a diagram illustrating an itaconate production pathway through introduction of a novel cis-aconitate synthesis enzyme in *E. coli* according to the present disclosure and a carbon flow compartmentalization according to the activity of the enzyme (Left: existing itaconate production pathway, Right: novel itaconate production pathway according to the present disclosure).

FIG. 2 is a diagram illustrating a comparison of a reaction mechanism and a reaction substrate of 2-methylstarate dehydratase (PrpD) and aconitase, which are wild types of the novel cis-aconitate synthesis enzyme according to the present disclosure.

FIG. 3A is a diagram illustrating results of analyzing citrate and itaconate production of a WAICP strain according to the present disclosure (▲: Acetate (g/L), ●: Cell biomass (g DCW/L), ■: Itaconate (g/L), ▼: Citrate (g/L)).

FIG. 3B is a diagram illustrating results of analyzing citrate and itaconate production of a WAICP$^{VTL}$ strain (▲: Acetate (g/L), ●: Cell biomass (g DCW/L), ■: Itaconate (g/L), ▼: Citrate (g/L)).

FIG. 4 is a diagram illustrating results of analyzing itaconate production of recombinant strains constructed through reverse engineering.

FIG. 5 is a diagram illustrating docking simulation results of PrpD and citrate of recombinant strains constructed through reverse engineering.

FIG. 6 is a diagram illustrating results of confirming an effect on itaconate production according to regulation of the expression level of PrpD$^{VL}$ according to the present disclosure.

DETAILED DESCRIPTION

Hereinafter, the present disclosure will be described in detail.

According to an aspect of the present disclosure, there are provided an expression cassette for introducing an itaconate production pathway including a 2-methylcitrate dehydratase (PrpD) gene represented by at least one nucleotide sequence selected from the group consisting of SEQ ID NOs: 1, 7 to 12, and 17; and a recombinant vector for producing itaconate including the expression cassette.

In the present disclosure, the itaconate is dicarboxylic acid composed of 5 carbons, and is used as a precursor for polymer synthesis, such as plastic and latex due to structural characteristics thereof.

In the present disclosure, the PrpD gene is 2-methylcitrate dehydratase PrpD derived from *Escherichia coli*, which is known to make 2-methyl cis-aconitate by dehydrating water molecules from 2-methylcitrate.

The present inventors used the substrate promiscuity of the PrpD gene to construct a novel enzyme PrpD$^{VTL}$ that converts citrate to cis-aconitate. The constructed novel enzyme PrpD$^{VTL}$ is represented by a nucleotide sequence set forth in SEQ ID NO: 1. In addition, through reverse engineering, major mutations of the novel enzyme PrpD$^{VTL}$, such as PrpD$^{V}$ (SEQ ID NO: 7), PrpD$^{T}$ (SEQ ID NO: 8), PrpD$^{L}$ (SEQ ID NO: 9), PrpD$^{TL}$ (SEQ ID NO: 10), PrpD$^{VT}$ (SEQ ID NO: 11), and PrpD$^{VL}$ (SEQ ID NO: 12) were obtained.

In an embodiment of the present disclosure, the expression cassette preferably further includes a cis-aconitate decarboxylase (Cad) gene represented by a nucleotide sequence set forth in SEQ ID NO: 2.

In the present disclosure, the cis-aconitate decarboxylase (Cad) gene is an enzyme capable of converting cis-aconitate derived from *Aspergillus terreus* to itaconate. The Cad gene of the present disclosure is represented by the nucleotide sequence set forth in SEQ ID NO: 2.

In the present disclosure, a novel itaconate synthesis pathway was constructed to separate a carbon flow according to the efficiency of a new enzyme kinetic between existing competing TCA cycle and itaconate synthesis by expressing the PrpD gene and the Cad gene. The novel itaconate synthesis pathway is shown in the right drawing of FIG. 1.

In a preferred embodiment of the present disclosure, the expression cassette may further include a Tac promoter represented by a nucleotide sequence set forth in SEQ ID NO: 5.

In an embodiment of the present disclosure, the expression cassette may further include a synthetic 5' untranslated region (UTR) represented by a nucleotide sequence set forth in SEQ ID NO: 18 or 19, preferably both synthetic 5' UTRs represented by nucleotide sequences set forth in SEQ ID NOs: 18 and 19.

In the present disclosure, the 5' untranslated region (UTR) is an untranslated region at 5' end and 3' end of mRNA, and in general, the 5' untranslated region (5' UTR) of mRNA performs several functions in the gene expression process, but among the functions, the largest feature is involved in regulating mRNA translation efficiency. It has been reported that a nucleotide sequence of the 5' UTR present in an adjacent upper portion of a translation initiation codon affects the efficiency of a translation step, and the length of the 5' UTR consists of 100 bases or more nucleotides, and the length of the 3' UTR consist of several kilobases longer. In addition, it has been reported results of studies on sequences belonging to the 5' UTR, which may be referred to as ribosome binding site sequences in eukaryotes, not at a fixed position such as a Shine-Dalgarno sequence, which was known as a ribosome binding site sequence located in the 5' UTR in prokaryotes.

In an embodiment of the present disclosure, the expression cassette preferably further includes at least one promoter selected from the group consisting of SEQ ID NOs: 6 and 13 to 16.

In the present disclosure, the expression cassette refers to a unit cassette that includes a promoter and a gene encoding a target protein and may be expressed to produce the target protein operably linked to the downstream of the promoter. Various factors capable of helping the efficient production of the target protein may be included inside or outside such an expression cassette. Specifically, in the target protein expression cassette, specifically, the gene encoding the target protein may be operably linked to the downstream of a promoter sequence.

In addition, variants of the gene are also included within the scope of the present disclosure. Specifically, the gene has a sequence homology of 70% or more, more preferably 80% or more, even more preferably 90% or more, and most preferably 95% or more with a nucleotide sequence set forth in SEQ ID NO. corresponding to each gene, and means a sequence that exhibits substantially the same physiological activity. The "% of sequence homology" with a polynucleotide is determined by comparing two optimally arranged sequences with a comparison region, and a part of a polynucleotide sequence in the comparison region may include addition or deletion (i.e., gap) compared to a reference sequence (not including addition or deletion) for an optimal alignment of the two sequences.

The 'operably linked' means that the gene sequence and the promoter sequence are functionally linked to each other so that a nucleic acid sequence having the promoter activity of the present disclosure initiates and mediates the transcription of the gene encoding the target protein. The operable linkage can be prepared using genetic recombination techniques known in the art, and site-specific DNA cleavage and linkage may be prepared using cleavage and linkage enzymes in the art, but are not limited thereto. That is, the 'recombinant gene expression cassette' can be inserted into a chromosome of a host cell and used to produce a recombinant microorganism, and for those skilled in the art to which the present disclosure pertains, it is obvious that even insertion of the recombinant gene expression cassette into the genomic chromosome of a host cell will have the same effect as the case of introducing the recombinant vector into the host cell as described above. As a method of inserting the recombinant gene expression cassette into the chromosome of the host cell, conventionally known genetic manipulation methods may be used. As an example, there is a method using a retrovirus vector, an adenovirus vector, an adeno-associated virus vector, a herpes simplex virus vector, a poxvirus vector, a lentiviral vector, or a non-viral vector.

In the present disclosure, the vector refers to a genetic construct including a nucleotide sequence of a gene operably linked to a suitable regulatory sequence so as to express a target gene in a suitable host. The regulatory sequence may include a promoter capable of initiating transcription, any operator sequence for regulating such transcription, and sequences regulating termination of transcription and translation. The vector of the present disclosure is not particularly limited as long as the vector is replicable in cells, and may use any vector known in the art, for example, a plasmid, a cosmid, a phage particle, or a viral vector.

In the present disclosure, when a coding gene of a target polypeptide to be expressed is operably linked, the recombinant vector may be used as an expression vector of a target polypeptide capable of expressing the target polypeptide with high efficiency in an appropriate host cell, and the recombinant vector can be expressed in a host cell. The host cell may preferably be a eukaryotic cell, and expression regulatory sequences such as a promoter, a terminator, and an enhancer, sequences for membrane targeting or secretion, etc. are appropriately selected according to a type of host cell and may be variously combined depending on a purpose.

The expression cassette and the vector for introducing the itaconate production pathway of the present disclosure may be introduced into a microorganism to prepare a recombinant microorganism for producing the itaconate. At this time, the introduced microorganism may be a wild-type *E. coli* W strain having resistance to acetate among *E. coli*, and may be a strain further including an aconitase B (AcnB) gene represented by a nucleotide sequence set forth in SEQ ID NO: 3, and/or in which an iclR gene represented by a nucleotide sequence set forth in SEQ ID NO: 4 is deleted. As a specific embodiment, the introduced microorganism may be a strain described in Table 1 to be described below.

According to yet another aspect of the present disclosure, the present disclosure provides a recombinant microorganism for producing itaconate into which a prpD gene represented by at least one nucleotide sequence selected from the group consisting of SEQ ID NOs: 1, 7 to 12, and 17 is introduced.

In an embodiment of the present disclosure, the recombinant microorganism preferably further includes a cis-aconitate decarboxylase (Cad) gene represented by a nucleotide sequence set forth in SEQ ID NO: 2.

In a preferred embodiment of the present disclosure, the recombinant microorganism may further include a Tac promoter represented by a nucleotide sequence set forth in SEQ ID NO: 5.

In an embodiment of the present disclosure, the recombinant microorganism preferably further includes an aconitase B (AcnB) gene represented by a nucleotide sequence set forth in SEQ ID NO: 3. The AcnB gene represented by the nucleotide sequence set forth in SEQ ID NO: 3 is an AcnB W482R variant, in which AcnB activity is reduced.

In an embodiment of the present disclosure, in the recombinant microorganism, preferably, an iclR gene represented by a nucleotide sequence set forth in SEQ ID NO: 4 is deleted.

In an embodiment of the present disclosure, the recombinant microorganism preferably further includes at least one promoter selected from the group consisting of SEQ ID NOs: 6 and 13 to 16.

In an embodiment of the present disclosure, the recombinant microorganism may further include a synthetic 5' untranslated region (UTR) represented by a nucleotide sequence set forth in SEQ ID NO: 18 or 19, preferably both synthetic 5' UTRs represented by nucleotide sequences set forth in SEQ ID NOs: 18 and 19.

In the present disclosure, the recombinant microorganism refers to a microorganism transformed with the recombinant vector of the present disclosure. In the present disclosure, the 'transformation' means introducing a vector including the promoter according to the present disclosure or further including the gene encoding the target protein into a host cell. In addition, a gene encoding the transformed target protein may be located to be inserted into the chromosome of the host cell or located outside the chromosome, as long as the gene may be expressed in the host cell.

In the present disclosure, one or a plurality of recombinant vectors may be introduced into the recombinant microorganism for producing the itaconate, and each of the one or the plurality of recombinant vectors may be introduced into the microorganism. In addition, the recombinant vector may be sequentially introduced into the microorganism, or may also be introduced in a mutually reversed order.

In an embodiment of the present disclosure, the recombinant microorganism for producing the itaconate may be characterized to be selected from the group consisting of bacteria, yeast, and fungi, and may preferably be a microorganism of the genus *Escherichia*, and more preferably *Escherichia coli.*

In an embodiment of the present disclosure, a wild-type *E. coli* W strain having resistance to acetate among *E. coli* was used.

Recombinant microorganisms constructed in the present disclosure are shown in Table 1 below.

TABLE 1

| Strain name | Characteristics |
|---|---|
| *E. coli* W | — |
| WA | Introduction of WenB W482R gene (SEQ ID NO: 3) with reduced WenB activity into *E. coli* W |
| WAI | Deletion of iclR gene of WA strain |
| WAIC | Introduction of recombinant expression cassette including Cad gene (SEQ ID NO: 2), Tac promoter (SEQ ID NO: 5), and synthetic 5' UTR (SEQ ID NO: 18) into WAI strain |

TABLE 1-continued

| Strain name | Characteristics |
|---|---|
| WAICP | Introduction of wild-type PrpD into WAIC strain by using recombinant expression cassette including synthetic promoter J23108 (SEQ ID NO: 6) and synthetic 5' UTR (SEQ ID NO: 19) |
| WAICP$^{VTL}$ | Introduction of mutant-type PrpD$^{VTL}$ into WAIC strain by using recombinant expression cassette including synthetic promoter J23108 (SEQ ID NO: 6) and synthetic 5' UTR (SEQ ID NO: 19) |
| WAICP$^{V}$ | Overexpression by introducing recombinant plasmid including PrpD$^{V}$ (SEQ ID NO: 7), J23108 promoter (SEQ ID NO: 6), and synthetic 5' UTR (SEQ ID NO: 19) into WAIC strain |
| WAICP$^{T}$ | Overexpression by introducing recombinant plasmid including PrpD$^{T}$ (SEQ ID NO: 8), J23108 promoter (SEQ ID NO: 6) and synthetic 5' UTR (SEQ ID NO: 19) into WAIC strain |
| WAICP$^{L}$ | Overexpression by introducing recombinant plasmid including PrpD$^{L}$ (SEQ ID NO: 9), J23108 promoter (SEQ ID NO: 6), and synthetic 5' UTR (SEQ ID NO: 19) into WAIC strain |
| WAICP$^{TL}$ | Overexpression by introducing recombinant plasmid including PrpD$^{TL}$ (SEQ ID NO: 10), J23108 promoter (SEQ ID NO: 6), and synthetic 5' UTR (SEQ ID NO: 19) into WAIC strain |
| WAICP$^{VT}$ | Overexpression by introducing recombinant plasmid including PrpD$^{VT}$ (SEQ ID NO: 11), J23108 promoter (SEQ ID NO: 6), and synthetic 5' UTR (SEQ ID NO: 19) into WAIC strain |
| WAICP$^{VL}$ | Overexpression by introducing recombinant plasmid including Prp$^{VL}$ (SEQ ID NO: 12), J23108 promoter (SEQ ID NO: 6), and synthetic 5' UTR (SEQ ID NO: 19) into WAIC strain |
| WAICP115$^{VL}$ | Application of J23115 promoter (SEQ ID NO: 13) and synthetic 5' UTR (SEQ ID NO: 19) to WAICP$^{VL}$ strain |
| WAICP114$^{VL}$ | Application of J23114 promoter (SEQ ID NO: 14) and synthetic 5' UTR (SEQ ID NO: 19) to WAICP$^{VL}$ strain |
| WAICP110$^{VL}$ | Application of J23100 promoter (SEQ ID NO: 15) and synthetic 5' UTR (SEQ ID NO: 19) to WAICP$^{VL}$ strain |
| WAICP100$^{VL}$ | Application of J23100 promoter (SEQ ID NO: 16) and synthetic 5' UTR (SEQ ID NO: 19) to WAICP$^{VL}$ strain |
| WCI (control) | Introduction of Cad gene recombination expression cassette with deleted iclR gene into *E. coli* W |

According to yet another aspect of the present disclosure, the present disclosure provides a method for producing itaconate including culturing a recombinant microorganism for producing itaconate.

Any medium and other culture conditions used for culturing the microorganism of the present disclosure may be used with any medium used for culturing conventional microorganisms of the genus *Escherichia*, but need to suitably satisfy the requirements of the microorganism of the present disclosure. Preferably, the microorganism of the present disclosure is cultured in a conventional medium containing appropriate carbon sources, nitrogen sources, amino acids, vitamins, etc. under aerobic conditions while controlling temperature, pH, and the like.

In a preferred embodiment of the present disclosure, the medium may include glucose, pyruvate, etc. as a carbon source. As the inorganic compound, sodium chloride, calcium chloride, iron chloride, magnesium sulfate, iron sulfate, manganese sulfate, calcium carbonate, and the like may be used, and in addition, amino acids, vitamins, appropriate precursors, and the like may be included. These media or precursors may be added to a culture solution in a batch or continuous manner.

During the culture, a compound such as ammonium hydroxide, potassium hydroxide, ammonia, phosphoric acid, and sulfuric acid is added to the culture solution by a proper method to adjust the pH of the culture solution. In addition, during the culture, production of bubbles may be inhibited by using an anti-foaming agent such as fatty acid polyglycol ester. Further, in order to maintain an aerobic state of the culture solution, oxygen or oxygen-containing gases may be injected into the culture solution, and in order to maintain anaerobic and aerobic states, gases are not injected or nitrogen, hydrogen, or carbon dioxide gas may be injected.

The temperature of the culture solution may be set usually 27° C. to 37° C., preferably 30° C. to 35° C. The culturing period may be continued until a desired production amount of a useful substance is obtained, preferably for 10 to 100 hours.

The method may further include purifying or recovering the itaconate produced in the culturing step of the present disclosure, and a method for recovering the itaconate from the microorganism or culture solution may be used with methods known in the art, such as centrifugation, filtration, anion exchange chromatography, crystallization, and HPLC, but is not limited to these examples.

The recovering step may include a purification process, and those skilled in the art may select and utilize several well-known purification processes as needed.

According to the recombinant microorganism for producing the itaconate of the present disclosure and the method for producing the itaconate using the same, it is possible to increase a production capacity of itaconate through the establishment of a novel synthesis pathway of accumulating cis-aconitate, a precursor of itaconate and an intermediate of a TCA cycle, in the microorganism, and separating the existing competing TCA cycle and itaconate synthesis.

Duplicated contents are omitted in consideration of the complexity of the present specification, and terms not defined otherwise in the present specification have the meanings commonly used in the art to which the present disclosure pertains.

Hereinafter, the present disclosure will be described in more detail through Examples. These Examples are just illustrative of the present disclosure, and it will be apparent to those skilled in the art that it is not interpreted that the scope of the present disclosure is limited to these Examples.

Example 1. Construction of Strain with Increased Intracellular Citrate Concentration for Improvement of Novel Cis-Aconitate Synthesis Enzyme First, an AcnB W482R gene (SEQ ID NO: 3) with reduced AcnB activity was introduced into wild-type *E. coli* W to construct a WA strain. A WAI strain from which an iclR gene (SEQ ID NO: 4) was deleted was constructed in the constructed WA strain. A WAIC strain was constructed by introducing a recombinant expression cassette including a Cad gene (SEQ ID NO: 2), a Tac promoter (SEQ ID NO: 5), and a synthetic 5' UTR (SEQ ID NO: 18) into the WAI strain.

In addition, as a control, a WCI strain was prepared in which a Cad gene recombination expression cassette was introduced into wild-type *E. coli* W while the iclR gene was deleted.

Example 2. Confirmation of Itaconate Production of Recombinant Microorganism Introduced with Novel Cis-Aconitate Synthesis Enzyme A novel enzyme PrpD$^{VTL}$ (SEQ ID NO: 1) of converting citrate to cis-aconitate, was constructed by using the substrate promiscuity of a 2-methylcitrate dehydratase (PrpD) gene. The novel enzyme PrpD$^{VTL}$ was an enzyme in which tryptophan No. 110, glycine No. 111, and isoleucine No. 331 based on wild-type PrpD (Accession No. NC_000913) were mutated to valine, threonine, and leucine, respectively. Specifically, a novel itaconate synthesis pathway was constructed to separate a carbon flow according to the efficiency of a new enzyme kinetic between existing competing TCA cycle and itaconate synthesis by expressing the PrpD$^{VTL}$ and the Cad gene (SEQ ID NO: 2). A schematic diagram of enzyme kinetic-based compartmentalization according to a reaction of the novel enzyme was shown in FIG. 1. In addition, a comparison of reaction substrates and reaction mechanisms of 2-methylcitrate dehydratase and aconitase was shown in FIG. 2.

Wild-type PrpD and screened mutant-type PrpD$^{VTL}$ were introduced into a WAIC strain by using a recombinant expression cassette including a synthetic promoter J23108 (SEQ ID NO: 6) and a synthetic 5' UTR (SEQ ID NO: 19), respectively, to construct WAICP and WAICP$^{VTL}$ strains.

In order to confirm that itaconate production was improved by the novel cis-aconitate synthesis enzyme, the constructed WAICP and WAICP$^{VTL}$ strains were cultured. Specifically, each of the two constructed strains was cultured on a solid LB agar plate to obtain individual colonies. The obtained individual colonies were cultured for about 12 hours in a flask under conditions of 30° C. and 200 rpm. The cultured strains were inoculated at a 1/100 dilution into 20 mL of a production medium contained in a 400 mL round flask, added with IPTG at a concentration of 0.1 mM, and then cultured under conditions of 30° C. and 200 rpm. Then, when an $OD_{600}$ value reached 1 to 2, the strains were inoculated into 20 mL of a production medium contained in a 300 mL round flask to become an $OD_{600}$ value of 0.05, and added with IPTG at a concentration of 0.1 mM. Thereafter, the strain was cultured under conditions of 30° C. and 200 rpm. The production medium used in the example was based on an M9 medium, and additionally added with 10 g/L of acetate and 2 g/L of yeast extract. At intervals of 12 hours of culture, 1 mL of the culture solution was separated from the culture cells by centrifugation. A supernatant was taken from the separated culture solution and quantitatively analyzed by HPLC. The HPLC analysis was performed using an Aminex HPX-87H column as a stationary phase and an aqueous 5 mM sulfuric acid solution as a mobile phase at a mobile phase rate of 0.6 mL per minute, and a Shodex RI-101 instrument was used for detection. The results of citrate and itaconate production of the constructed WAICP and WAICP$^{VTL}$ strains were shown in FIGS. 3A and 3B, respectively.

As shown in FIGS. 3A and 3B, it was confirmed that the citrate production of the WAICP$^{VTL}$ strain was significantly increased compared to that of the WAICP strain.

Example 3. Identification of Key Mutant Residues Through Reverse Engineering and Preparation of Recombinant Microbial Strains with Further Improved Itaconate Production Capacity In Example 3, it was confirmed which residue among mutated residues of the screened PrpD-based novel cis-aconitate synthesis enzyme had a major effect on increasing the reactivity to citrate. To this end, reverse engineering was performed by mutating one or two of three mutated amino acid sequences. PrpD mutants for reverse engineering were as follows.

PrpD$^{V}$ (SEQ ID NO: 7)
PrpD$^{T}$ (SEQ ID NO: 8)
PrpD$^{L}$ (SEQ ID NO: 9)
PrpD$^{TL}$ (SEQ ID NO: 10)
PrpD$^{VT}$ (SEQ ID NO: 11)
PrpD$^{VL}$ (SEQ ID NO: 12)

In addition, a PrpD variant prepared through the reverse engineering was introduced into a recombinant plasmid containing a J23108 promoter (SEQ ID NO: 6) and a synthetic 5' UTR (SEQ ID NO: 19) to be overexpressed. Based on the WAIC strain with an increased intracellular concentration of citrate while the production of itaconate was confirmed in Example 1, recombinant strains were constructed by introducing recombinant plasmids of wild-type PrpD, a mutant type of PrpD, a screened novel cis-aconitate synthesis enzyme, and mutant types of PrpD produced through reverse engineering. The constructed recombinant strains were as follows.

WAICP: *Escherichia coli* W having AcnB W482R with low AcnB activity, and introduced with Cad and wild-type PrpD while IclR was deleted WAICP$^{VTL}$: *Escherichia coli* W having AcnB W482R with low AcnB activity, and introduced with Cad and screened novel cis-aconitate synthesis enzyme PrpD$^{VTL}$ while IclR was deleted WAICP$^{V}$: *Escherichia coli* W having AcnB W482R with low AcnB activity, and introduced with Cad and PrpD$^{V}$ prepared through reverse engineering while IclR was deleted WAICP$^{T}$: *Escherichia coli* W having AcnB W482R with low AcnB activity, and introduced with Cad and PrpD$^{T}$ prepared through reverse engineering while IclR was deleted WAICP$^{L}$: *Escherichia coli* W having AcnB W482R with low AcnB activity, and introduced with Cad and PrpD$^{L}$ prepared through reverse engineering while IclR was deleted

- WAICP$^{TL}$: *Escherichia coli* W having AcnB W482R with low AcnB activity, and introduced with Cad and PrpD$^{TL}$ prepared through reverse engineering while IclR was deleted
- WAICP$^{VT}$: *Escherichia coli* W having AcnB W482R with low AcnB activity, and introduced with Cad and PrpD$^{VT}$ prepared through reverse engineering while IclR was deleted
- WAICP$^{VL}$: *Escherichia coli* W having AcnB W482R with low AcnB activity, and expressed with Cad and PrpD$^{VL}$ prepared through reverse engineering by J23108 promoter and synthetic 5' UTR while IclR was deleted Each of the 8 recombinant strains constructed in Example 2 and Example 3 was cultured to produce itaconate, and the produced itaconate was quantified. The production and quantification of itaconate were performed in the same manner as in Example 2. The production results of itaconate of the 8 constructed recombinant strains were shown in FIG. 4.

As shown in FIG. 4, the itaconate production strains WAICP$^{VTL}$, WAICP$^{VT}$, and WAICP$^{VL}$ introduced with a mutant of PrpD, which was a screened novel citrate synthesis enzyme, were significantly increased in itaconate productivity compared to the previous strains.

In order to analyze the interaction between citrate and residues near an active site of the enzyme, docking simulations of wild-type PrpD and improved novel PrpD variants were performed. The docking simulation analysis results were shown in FIG. 5.

As shown in FIG. 5, it was confirmed through docking simulation that the reactivity of PrpD to citrate was changed.

Example 4. Confirmation of Difference in Itaconate Production Through Regulation of Expression Level of Novel Citrate Synthesis Enzyme and Demonstration of Carbon Flow Compartmentalization Based on Enzyme Kinetic In Example 4, the itaconate production capacity was analyzed according to a control of the expression level of the WAICP$^{VL}$ strain, which had a significantly higher itaconate production capacity than the WAICP$^{VTL}$ strain obtained through reverse engineering in Example 3. That is, it was confirmed whether a carbon flow toward itaconate could be separated from the existing TCA cycle according to the regulation of the expression level of PrpD$^{VL}$.

As a result, an unnatural reaction for newly synthesizing cis-aconitate was constructed through a novel PrpD-based aconitate synthesis enzyme without the existing TCA cycle for temporarily synthesizing cis-aconitate. The carbon flow through the reaction could be changed according to the regulation of the expression level of the novel aconitate synthesis enzyme. This means that carbon flow can be compartmentalized in the existing TCA cycle based on the activity of the novel enzyme, so that the expression level was regulated by varying a synthetic promoter of PrpD$^{VL}$ of a strain with the highest itaconate concentration. Recombinant strains constructed with different synthetic promoters of PrpD$^{VL}$ were as follows.

- WAICP115$^{VL}$: *Escherichia coli* W having AcnB W482R with low AcnB activity, and expressing Cad and PrpD$^{VL}$ prepared through reverse engineering by J23115 promoter (SEQ ID NO: 13) and synthetic 5' UTR (SEQ ID NO: 19) while IclR was deleted
- WAICP114$^{VL}$: *Escherichia coli* W having AcnB W482R with low AcnB activity, and expressing Cad and PrpD$^{VL}$ prepared through reverse engineering by J23114 promoter (SEQ ID NO: 14) and synthetic 5' UTR (SEQ ID NO: 19) while IclR was deleted
- WAICP110$^{VL}$: *Escherichia coli* W having AcnB W482R with low AcnB activity, and expressing Cad and PrpD$^{VL}$ prepared through reverse engineering by J23110 promoter (SEQ ID NO: 15) and synthetic 5' UTR (SEQ ID NO: 19) while IclR was deleted
- WAICP100$^{VL}$: *Escherichia coli* W having AcnB W482R with low AcnB activity, and expressing Cad and PrpD$^{VL}$ prepared through reverse engineering by J23100 promoter (SEQ ID NO: 16) and synthetic 5' UTR (SEQ ID NO: 19) while IclR was deleted The constructed recombinant strains produced and quantified itaconate in the same manner as in Example 2 above. The results of analyzing the itaconate production of the constructed recombinant strain were shown in FIG. 6.

As shown in FIG. 6, the production of itaconate in the recombinant strain WAICP100$^{VL}$ for 48 hours was about 1.45-fold increased compared to the recombinant strain WAICP114$^{VL}$. Accordingly, it was confirmed that the carbon flow toward itaconate was separated according to the expression level of the novel cis-aconitate synthesis enzyme. This means that the recombinant strain can separate the carbon flow from the existing TCA cycle according to the reactivity of the newly constructed cis-aconitate synthesis enzyme.

All sequences of genes used in Examples of the present disclosure are shown in Table 2.

TABLE 2

| SEQ ID NO: | Name | Sequence |
|---|---|---|
| 1 | PrpD$^{VTL}$ | ATGTCAGCTCAAATCAACAACATCCGCCCGGA<br>ATTTGATCGTGAAATCGTTGATATCGTCGATT<br>ACGTCATGAACTACGAAATCAGCTCTAAAGTG<br>GCCTACGACACCGCACATTACTGCCTGCTCGA<br>CACGCTCGGCTGCGGTCTGGAAGCTCTCGAAT<br>ACCCGGCCTGTAAAAAACTGCTGGGGCCAATT<br>GTTCCCGGCACCGTCGTACCCAACGGCGTGCG<br>CGTCCCCGGAACTCAGTTCCAGCTCGACCCCG<br>TCCAGGCGGCATTTAACATCGGCGCGATGATC<br>CGCTGGCTCGATTTCAACGATACCTGGCTGGC<br>GGCGGAGgttactCATCCTTCCGACAACCTCG<br>GCGGCATTCTGGCAACGGCGGACTGGCTTTCG<br>CGCAACGCGGTCGCCAGCGGCAAAGCGCCGTT<br>GACCATGAAACAGGTGCTGACCGCAATGATCA<br>AAGCCCATGAAATTCAGGGCTGCATCGCGCTG<br>GAAAACTCCTTTAACCGCGTCGGCCTCGACCA |

TABLE 2-continued

| SEQ ID NO: | Name | Sequence |
|---|---|---|
| | | CGTTCTGTTAGTGAAAGTGGCTTCCACCGCCG<br>TGGTCGCCGAAATGCTCGGCCTGACCCGCGAG<br>GAAATTCTCAACGCCGTTTCGCTGGCGTGGGT<br>GGACGGTCAGTCGCTGCGCACCTATCGCCATG<br>CGCCGAACACCGGCACGCGTAAATCCTGGGCG<br>GCGGGCGATGCCACTTCCCGCGCGGTACGTCT<br>GGCACTGATGGCGAAAACGGGCGAAATGGGTT<br>ACCCGTCAGCCCTAACCGCGCCGGTATGGGGC<br>TTCTACGACGTCTCCTTTAAAGGTGAATCGTT<br>CCGCTTCCAGCGTCCGTACGGTTCTTACGTCA<br>TGGAGAATGTGCTGTTCAAAATCTCCTTCCCG<br>GCGGAGTTCCACTCCCAGACGGCAGTTGAAGC<br>GGCGATGACGCTCTATGAACAGATGCAGGCAG<br>CAGGCAAGACGGCGGCGGATATCGAAAAAGTG<br>ACCATTCGCACCCACGAAGCCTGTATTCGCct<br>aATCGACAAAAAGGGGCCGCTCAATAACCCGG<br>CTGACCGCGACCACTGCATTCAGTACATGGTG<br>GCGATCCCGCTGTTATTCGGGCGCTTAACGGC<br>GGCAGATTACGAGGACAACGTTGCGCAAGATA<br>AACGCATCGACGCCCTGCGCGAGAAGATCAAT<br>TGCTTTGAAGATCCGGCATTTACCGCTGACTA<br>CCACGACCCGGAAAAACGCGCCATCGCCAATG<br>CCATTACCCTTGAGTTCACCGACGGCACACGA<br>TTTGAAGAAGTGGTGGTGGAGTACCCCATTGG<br>TCATGCTCGCCGCCGTCAGGATGGTATTCCGA<br>AACTGGTCGATAAATTCAAAATCAATCTCGCG<br>CGCCAGTTCCCGACTCGCCAACAGCAGCGCAT<br>TCTGGAGGTTTCTCTCGACAGAACTCGCCTGG<br>AACAGATGCCGGTCAATGAGTATCTCGACCTG<br>TACGTCATTTAA |
| 2 | Cad | ATGACCAAACAGAGCGCAGATAGCAATGCAAA<br>AAGCGGTGTTACCAGCGAAATTTGTCATTGGG<br>CAAGCAATCTGGCAACCGATGATATTCCGAGT<br>GATGTTCTGGAACGTGCCAAATATCTGATTCT<br>GGATGGTATTGCATGTGCATGGGTTGGTGCAC<br>GTGTTCCGTGGTCAGAAAAATATGTTCAGGCA<br>ACCATGAGCTTTGAACCGCCTGGTGCATGTCG<br>TGTTATTGGTTATGGCCAGAAACTGGGTCCGG<br>TTGCAGCAGCAATGACCAATAGCGCATTTATT<br>CAGGCCACCGAACTGGATGATTATCATAGCGA<br>AGCACCGCTGCATAGCGCAAGCATTGTTCTGC<br>CTGCAGTTTTTGCAGCAAGCGAAGTTCTGGCA<br>GAACAGGGTAAAACCATTAGCGGTATTGATGT<br>TATTCTGGCAGCCATTGTTGGTTTTGAAAGCG<br>GTCCGCGTATTGGTAAAGCAATTTATGGTAGC<br>GATCTGCTGAATAATGGTTGGCATTGTGGTGC<br>AGTTTATGGTGCACCGGCAGGCGCACTGGCCA<br>CCGGTAAACTGCTGGGTCTGACACCGGATAGC<br>ATGGAAGATGCACTGGGTATTGCCTGTACCCA<br>GGCATGTGGTCTGATGAGCGCACAGTATGGTG<br>GTATGGTTAAACGTGTTCAGCATGGTTTTGCA<br>GCCCGTAATGGTCTGCTGGGTGGCCTGCTGGC<br>ACATGGTGGTTATGAAGCAATGAAAGGTGTGC<br>TGGAACGTAGCTATGGTGGTTTTCTGAAAATG<br>TTTACCAAAGGCAATGGTCGTGAACCTCCGTA<br>TAAAGAAGAAGAAGTIGTTGCAGGTCTGGGTA<br>GCTTTTGGCATACCTTTACCATTCGCATTAAA<br>CTGTATGCATGTTGTGGTCTGGTTCATGGTCC<br>GGTGGAAGCAATTGAAAATCTGCAGGGTCGTT<br>ATCCGGAACTGCTGAATCGTGCAAATCTGAGC<br>AATATTCGTCATGTTCATGTTCAGCTGAGCAC<br>CGCAAGCAATAGCCATTGCGGTTGGATTCCGG<br>AAGAACGTCCGATTAGCAGCATTGCAGGTCAG<br>ATGAGCGTTGCATATATTCTGGCCGTTCAGCT<br>GGTTGATCAGCAGTGTCTGCTGAGCCAGTTTA<br>GCGAATTTGATGATAACCTGGAACGTCCGGAA<br>GTTTGGGATCTGGCACGTAAAGTTACCAGCAG<br>CCAGAGCGAAGAATTTGATCAGGATGGTAATT<br>GTCTGAGCGCAGGTCGTGTTCGTATTGAATTT<br>AATGATGGTTCCAGCATTACCGAAAGCGTTGA<br>AAAACCGCTGGGTGTTAAAGAACCGATGCCGA<br>ATGAACGTATCCTGCATAAATATCGTACCCTG<br>GCAGGTAGCGTTACCGATGAAAGCCGTGTGAA |

TABLE 2-continued

| SEQ ID NO: | Name | Sequence |
|---|---|---|
| | | AGAAATTGAAGATCTGGTTCTGGGTCTGGATC<br>GTCTGACCGATATTAGTCCGCTGCTGGAACTG<br>CTGAACTGTCCGGTTAAAAGTCCGCTGGTTTA<br>A |
| 3 | AcnB W482R | GTGCTAGAAGAATACCGTAAGCACGTAGCTGA<br>GCGTGCCGCTGAGGGGATTGCGCCCAAACCCC<br>TGGATGCAAACCAAATGGCCGCACTTGTAGAG<br>CTGCTGAAAAACCCGCCCGCGGGCGAAGAAGA<br>ATTCCTGTTAGATCTGTTAACCAACCGTGTTC<br>CCCCTGGCGTCGATGAAGCCGCCTATGTCAAA<br>GCAGGCTTCCTGGCTGCTATCGCGAAAGGCGA<br>AGCCAAATCCCCTCTGCTGACTCCGGAAAAAG<br>CCATCGAACTGCTGGGCACCATGCAGGGTGGT<br>TACAACATTCATCCGCTGATCGACGCGCTGGA<br>TGATGCCAAACTGGCACCGATCGCTGCCAAAG<br>CACTTTCTCACACACTGCTGATGTTCGATAAC<br>TTCTATGACGTAGAAGAGAAAGCGAAAGCAGG<br>CAACGAATATGCGAAGCAGGTAATGCAGTCCT<br>GGGCGGATGCCGAATGGTTCCTGAATCGCCCG<br>GTGCTGGCTGAAAAACTGACCGTTACCGTCTT<br>CAAAGTCACTGGCGAAACCAACACCGATGACC<br>TTTCTCCGGCACCGGATGCGTGGTCGCGCCCG<br>GATATCCCACTGCACGCGCTGGCGATGCTGAA<br>AAACGCCCGTGAAGGTATTGAGCCAGACCAGC<br>CAGGTGTTGTTGGCCCGATCAAACAGATTGAA<br>GCTCTGCAACAGAAAGGTTTCCCGCTGGCGTA<br>CGTCGGTGACGTTGTGGGTACGGGTTCATCGC<br>GTAAATCCGCCACGAACTCCGTTCTGTGGTTT<br>ATGGGCGATGATATTCCACATGTGCCGAACAA<br>ACGCGGCGGTGGTTTGTGCCTCGGCGGTAAAA<br>TTGCACCCATCTTCTTTAACACGATGGAAGAC<br>GCGGGTGCACTGCCAATCGAAGTCGACGTCTC<br>TAACCTGAACATGGGCGACGTGATTGACGTTT<br>ACCCGTACAAAGGTGAAGTGCGTAACCACGAA<br>ACAGGCGAACTGCTGGCGACCTTCGAACTGAA<br>AACCGACGTGCTGATTGATGAAGTGCGTGCTG<br>GCGGCCGTATCCCGCTGATTATCGGGCGTGGC<br>CTGACCACCAAAGCGCGTGAAGCACTTGGTCT<br>GCCGCACAGTGATGTGTTCCGTCAGGCGAAAG<br>ATGTCGCTGAGAGCGATCGCGGCTTCTCGCTG<br>GCGCAGAAAATGGTAGGCCGTGCCTGTGGCGT<br>GAAAGGCATTCGTCCGGGCGCGTACTGCGAAC<br>CGAAAATGACTTCTGTAGGCTCTCAGGACACC<br>ACCGGCCCGATGACCCGTGATGAACTGAAAGA<br>CCTGGCGTGCCTGGGCTTCTCGGCTGACCTGG<br>TGATGCAGTCTTTCTGCCACACCGCGGCGTAT<br>CCGAAGCCAGTTGACGTGAACACGCACCACAC<br>GCTGCCGGACTTCATTATGAACCGTGGCGGTG<br>TGTCGCTGCGTCCGGGTGACGGCGTCATTCAC<br>TCCCGGCTGAACCGTATGCTGCTGCCGGATAC<br>CGTCGGTACCGGTGGTGATTCCCATACCCGTT<br>TCCCGATCGGTATCTCTTTCCCGGCGGGTTCT<br>GGTCTGGTGGCATTTGCAGCCGCAACAGGCGT<br>AATGCCGCTGGATATGCCGGAATCCGTTCTGG<br>TGCGCTTCAAAGGCAAAATGCAGCCGGGCATC<br>ACCCTGCGCGATCTGGTACATGCCATTCCGCT<br>GTATGCGATCAAACAAGGTCTGCTGACCGTTG<br>AGAAGAAAGGCAAGAAAAACATCTTCTCTGGC<br>CGCATCCTGGAAATTGAAGGTCTGCCGGATCT<br>GAAAGTTGAGCAGGCATTTGAACTGACCGATG<br>CGTCCGCCGAGCGTTCTGCCGCTGGTTGTACC<br>ATCAAGCTGAACAAAGAACCGATCATCGAATA<br>CCTGAACTCTAACATCGTCCTGCTGAAGTGGA<br>TGATCGCGGAAGGTTACGGCGATCGTCGCACC<br>CTGGAACGTCGTATTCAGGGCATGGAAAAATG<br>GCTGGCGAATCCTGAGCTGCTGGAAGCCGATG<br>CAGATGCTGAATACGCGGCAGTGATCGACATC<br>GATCTGGCGGATATTAAAGAGCCAATCCTCTG<br>TGCACCGAACGACCCGGATGACGCGCGTCCGC<br>TGTCTGCGGTACAGGGTGAGAAGATCGACGAA<br>GTATTTATCGGTTCCTGCATGACCAACATCGG<br>TCACTTCCGTGCTGCGGGTAAACTGCTGGATG<br>CGCACAAAGGCCAACTGCCGACCCGCCTGTGG<br>GTGGCACCGCCAACCCGTATGGACGCCGCGCA<br>GTTGACTGAAGAAGGCTACTACAGCGTCTTCG<br>GTAAGAGTGGTGCGCGTATCGAGATCCCGGGC |

TABLE 2-continued

| SEQ ID NO: | Name | Sequence |
| --- | --- | --- |
| | | TGTTCTCTGTGTATGGGTAACCAGGCGCGTGT<br>AGCAGACGGTGCGACGGTGGTTTCCACCTCTA<br>CCCGTAACTTCCCGAACCGTCTGGGTACTGGC<br>GCGAATGTCTTCCTGGCTTCTGCGGAACTGGC<br>GGCTGTTGCGGCGCTGATTGGCAAACTGCCGA<br>CGCCGGAAGAGTACCAGACCTACGTGGCGCAA<br>GTAGATAAAACTGCCGTTGATACTTATCGTTA<br>TCTGAACTTCAACCAGCTTTCTCAGTACACCG<br>AAAAAGCCGATGGGGTGATTTTCCAGACTGCG<br>GTGTAA |
| 4 | ic1R | ATGGTCGCACCCATTCCCGCGAAACGCGGCAG<br>AAAACCCGCCGTTGCCACCGCACCAGCGACTG<br>GACAGGTTCAGTCTTTAACGCGTGGCCTGAAA<br>TTACTGGAGTGGATTGCCGAATCCAATGGCAG<br>TGTGGCACTCACAGAGCTGGCGCAACAAGCCG<br>GGTTACCCAATTCCACGACCCACCGCCTGCTA<br>ACCACGATGCAACAGCAGGGTTTCGTGCGTCA<br>GGTCGGCGAACTGGGACATTGGGCAATCGGCG<br>CACATGCCTTTATGGTCGGCAGCAGCTTTCTC<br>CAGAGCCGTAATTTGTTAGCGATTGTTCACCC<br>TATCCTGCGCAATTTAATGGAAGAGTCTGGCG<br>AAACGGTCAATATGGCGGTGCTTGATCAAAGC<br>GATCACGAAGCGATTATTATCGACCAGGTACA<br>GTGTACGCATCTGATGCGAATGTCCGCGCCTA<br>TCGGCGGTAAATTGCCGATGCACGCTTCCGGT<br>GCGGGTAAAGCCTTTTTAGCCCAACTGAGCGA<br>AGAACAGGTGACGAAGCTGCTGCACCGCAAAG<br>GGTTACATGCCTATACCCACGCAACGCTGGTG<br>TCTCCTGTGCATTTAAAAGAAGATCTCGCCCA<br>AACGCGCAAACGGGGTTATTCATTTGACGATG<br>AGGAACATGCACTGGGGCTACGTTGCCTTGCA<br>GCGTGTATTTTCGATGAGCACCGCGAACCGTT<br>TGCCGCAATTTCAATTTCCGGACCGATTTCAC<br>GTATTACCGATGACCGCGTGACCGAGTTTGGC<br>GCGATGGTGATTAAAGCGGCGAAGGAAGTGAC<br>GCTGGCGTACGGTGGAATGCGCTGA |
| 5 | Tac promoter | ttgacaattaatcatcggctcgtataatg |
| 6 | J23108 promoter | ctgacagctagctcagtcctaggtataatgct<br>agc |
| 7 | PrpD$^{V}$ | ATGTCAGCTCAAATCAACAACATCCGCCCGGA<br>ATTTGATCGTGAAATCGTTGATATCGTCGATT<br>ACGTCATGAACTACGAAATCAGCTCTAAAGTG<br>GCCTACGACACCGCACATTACTGCCTGCTCGA<br>CACGCTCGGCTGCGGTCTGGAAGCTCTCGAAT<br>ACCCGGCCTGTAAAAAACTGCTGGGGCCAATT<br>GTTCCCGGCACCGTCGTACCCAACGGCGTGCG<br>CGTCCCCGGAACTCAGTTCCAGCTCGACCCCG<br>TCCAGGCGGCATTTAACATCGGCGCGATGATC<br>CGCTGGCTCGATTTCAACGATACCTGGCTGGC<br>GGCGGAGgttGGCCATCCTTCCGACAACCTCG<br>GCGGCATTCTGGCAACGGCGGACTGGCTTTCG<br>CGCAACGCGGTCGCCAGCGGCAAAGCGCCGTT<br>GACCATGAAACAGGTGCTGACCGCAATGATCA<br>AAGCCCATGAAATTCAGGGCTGCATCGCGCTG<br>GAAAACTCCTTTAACCGCGTCGGCCTCGACCA<br>CGTTCTGTTAGTGAAAGTGGCTTCCACCGCCG<br>TGGTCGCCGAAATGCTCGGCCTGACCCGCGAG<br>GAAATTCTCAACGCCGTTTCGCTGGCGTGGGT<br>GGACGGTCAGTCGCTGCGCACCTATCGCCATG<br>CGCCGAACACCGGCACGCGTAAATCCTGGGCG<br>GCGGGCGATGCCACTTCCCGCGCGGTACGTCT<br>GGCACTGATGGCGAAAACGGGCGAAATGGGTT<br>ACCCGTCAGCCCTAACCGCGCCGGTATGGGGC<br>TTCTACGACGTCTCCTTTAAAGGTGAATCGTT<br>CCGCTTCCAGCGTCCGTACGGTTCTTACGTCA<br>TGGAGAATGTGCTGTTCAAAATCTCCTTCCCG<br>GCGGAGTTCCACTCCCAGACGGCAGTTGAAGC<br>GGCGATGACGCTCTATGAACAGATGCAGGCAG<br>CAGGCAAGACGGCGGCGGATATCGAAAAAGTG<br>ACCATTCGCACCCACGAAGCCTGTATTCGCAT<br>CATCGACAAAAAGGGGCCGCTCAATAACCCGG<br>CTGACCGCGACCACTGCATTCAGTACATGGTG<br>GCGATCCCGCTGTTATTCGGGCGCTTAACGGC |

TABLE 2-continued

| SEQ ID NO: | Name | Sequence |
|---|---|---|
| | | GGCAGATTACGAGGACAACGTTGCGCAAGATA |
| | | AACGCATCGACGCCCTGCGCGAGAAGATCAAT |
| | | TGCTTTGAAGATCCGGCATTTACCGCTGACTA |
| | | CCACGACCCGGAAAAACGCGCCATCGCCAATG |
| | | CCATTACCCTTGAGTTCACCGACGGCACACGA |
| | | TTTGAAGAAGTGGTGGTGGAGTACCCCATTGG |
| | | TCATGCTCGCCGCCGTCAGGATGGTATTCCGA |
| | | AACTGGTCGATAAATTCAAAATCAATCTCGCG |
| | | CGCCAGTTCCCGACTCGCCAACAGCAGCGCAT |
| | | TCTGGAGGTTTCTCTCGACAGAACTCGCCTGG |
| | | AACAGATGCCGGTCAATGAGTATCTCGACCTG |
| | | TACGTCATTTAA |
| 8 | PrpD$^{T}$ | ATGTCAGCTCAAATCAACAACATCCGCCCGGA |
| | | ATTTGATCGTGAAATCGTTGATATCGTCGATT |
| | | ACGTCATGAACTACGAAATCAGCTCTAAAGTG |
| | | GCCTACGACACCGCACATTACTGCCTGCTCGA |
| | | CACGCTCGGCTGCGGTCTGGAAGCTCTCGAAT |
| | | ACCCGGCCTGTAAAAAACTGCTGGGGCCAATT |
| | | GTTCCCGGCACCGTCGTACCCAACGGCGTGCG |
| | | CGTCCCCGGAACTCAGTTCCAGCTCGACCCCG |
| | | TCCAGGCGGCATTTAACATCGGCGCGATGATC |
| | | CGCTGGCTCGATTTCAACGATACCTGGCTGGC |
| | | GGCGGAGTGGactCATCCTTCCGACAACCTCG |
| | | GCGGCATTCTGGCAACGGCGGACTGGCTTTCG |
| | | CGCAACGCGGTCGCCAGCGGCAAAGCGCCGTT |
| | | GACCATGAAACAGGTGCTGACCGCAATGATCA |
| | | AAGCCCATGAAATTCAGGGCTGCATCGCGCTG |
| | | GAAAACTCCTTTAACCGCGTCGGCCTCGACCA |
| | | CGTTCTGTTAGTGAAAGTGGCTTCCACCGCCG |
| | | TGGTCGCCGAAATGCTCGGCCTGACCCGCGAG |
| | | GAAATTCTCAACGCCGTTTCGCTGGCGTGGGT |
| | | GGACGGTCAGTCGCTGCGCACCTATCGCCATG |
| | | CGCCGAACACCGGCACGCGTAAATCCTGGGCG |
| | | GCGGGCGATGCCACTTCCCGCGCGGTACGTCT |
| | | GGCACTGATGGCGAAAACGGGCGAAATGGGTT |
| | | ACCCGTCAGCCCTAACCGCGCCGGTATGGGGC |
| | | TTCTACGACGTCTCCTTTAAAGGTGAATCGTT |
| | | CCGCTTCCAGCGTCCGTACGGTTCTTACGTCA |
| | | TGGAGAATGTGCTGTTCAAAATCTCCTTCCCG |
| | | GCGGAGTTCCACTCCCAGACGGCAGTTGAAGC |
| | | GGCGATGACGCTCTATGAACAGATGCAGGCAG |
| | | CAGGCAAGACGGCGGCGGATATCGAAAAAGTG |
| | | ACCATTCGCACCCACGAAGCCTGTATTCGCAT |
| | | CATCGACAAAAAGGGGCCGCTCAATAACCCGG |
| | | CTGACCGCGACCACTGCATTCAGTACATGGTG |
| | | GCGATCCCGCTGTTATTCGGGCGCTTAACGGC |
| | | GGCAGATTACGAGGACAACGTTGCGCAAGATA |
| | | AACGCATCGACGCCCTGCGCGAGAAGATCAAT |
| | | TGCTTTGAAGATCCGGCATTTACCGCTGACTA |
| | | CCACGACCCGGAAAAACGCGCCATCGCCAATG |
| | | CCATTACCCTTGAGTTCACCGACGGCACACGA |
| | | TTTGAAGAAGTGGTGGTGGAGTACCCCATTGG |
| | | TCATGCTCGCCGCCGTCAGGATGGTATTCCGA |
| | | AACTGGTCGATAAATTCAAAATCAATCTCGCG |
| | | CGCCAGTTCCCGACTCGCCAACAGCAGCGCAT |
| | | TCTGGAGGTTTCTCTCGACAGAACTCGCCTGG |
| | | AACAGATGCCGGTCAATGAGTATCTCGACCTG |
| | | TACGTCATTTAA |
| 9 | PrpD$^{L}$ | ATGTCAGCTCAAATCAACAACATCCGCCCGGA |
| | | ATTTGATCGTGAAATCGTTGATATCGTCGATT |
| | | ACGTCATGAACTACGAAATCAGCTCTAAAGTG |
| | | GCCTACGACACCGCACATTACTGCCTGCTCGA |
| | | CACGCTCGGCTGCGGTCTGGAAGCTCTCGAAT |
| | | ACCCGGCCTGTAAAAAACTGCTGGGGCCAATT |
| | | GTTCCCGGCACCGTCGTACCCAACGGCGTGCG |
| | | CGTCCCCGGAACTCAGTTCCAGCTCGACCCCG |
| | | TCCAGGCGGCATTTAACATCGGCGCGATGATC |
| | | CGCTGGCTCGATTTCAACGATACCTGGCTGGC |
| | | GGCGGAGTGGGGCCATCCTTCCGACAACCTCG |
| | | GCGGCATTCTGGCAACGGCGGACTGGCTTTCG |
| | | CGCAACGCGGTCGCCAGCGGCAAAGCGCCGTT |
| | | GACCATGAAACAGGTGCTGACCGCAATGATCA |
| | | AAGCCCATGAAATTCAGGGCTGCATCGCGCTG |
| | | GAAAACTCCTTTAACCGCGTCGGCCTCGACCA |
| | | CGTTCTGTTAGTGAAAGTGGCTTCCACCGCCG |

TABLE 2-continued

| SEQ ID NO: | Name | Sequence |
|---|---|---|
| | | TGGTCGCCGAAATGCTCGGCCTGACCCGCGAG |
| | | GAAATTCTCAACGCCGTTTCGCTGGCGTGGGT |
| | | GGACGGTCAGTCGCTGCGCACCTATCGCCATG |
| | | CGCCGAACACCGGCACGCGTAAATCCTGGGCG |
| | | GCGGGCGATGCCACTTCCCGCGCGGTACGTCT |
| | | GGCACTGATGGCGAAAACGGGCGAAATGGGTT |
| | | ACCCGTCAGCCCTAACCGCGCCGGTATGGGGC |
| | | TTCTACGACGTCTCCTTTAAAGGTGAATCGTT |
| | | CCGCTTCCAGCGTCCGTACGGTTCTTACGTCA |
| | | TGGAGAATGTGCTGTTCAAAATCTCCTTCCCG |
| | | GCGGAGTTCCACTCCCAGACGGCAGTTGAAGC |
| | | GGCGATGACGCTCTATGAACAGATGCAGGCAG |
| | | CAGGCAAGACGGCGGCGGATATCGAAAAAGTG |
| | | ACCATTCGCACCCACGAAGCCTGTATTCGCct |
| | | aATCGACAAAAAGGGGCCGCTCAATAACCCGG |
| | | CTGACCGCGACCACTGCATTCAGTACATGGTG |
| | | GCGATCCCGCTGTTATTCGGGCGCTTAACGGC |
| | | GGCAGATTACGAGGACAACGTTGCGCAAGATA |
| | | AACGCATCGACGCCCTGCGCGAGAAGATCAAT |
| | | TGCTTTGAAGATCCGGCATTTACCGCTGACTA |
| | | CCACGACCCGGAAAAACGCGCCATCGCCAATG |
| | | CCATTACCCTTGAGTTCACCGACGGCACACGA |
| | | TTTGAAGAAGTGGTGGTGGAGTACCCCATTGG |
| | | TCATGCTCGCCGCCGTCAGGATGGTATTCCGA |
| | | AACTGGTCGATAAATTCAAAATCAATCTCGCG |
| | | CGCCAGTTCCCGACTCGCCAACAGCAGCGCAT |
| | | TCTGGAGGTTTCTCTCGACAGAACTCGCCTGG |
| | | AACAGATGCCGGTCAATGAGTATCTCGACCTG |
| | | TACGTCATTTAA |
| 10 | $PrpD^{TL}$ | ATGTCAGCTCAAATCAACAACATCCGCCCGGA |
| | | ATTTGATCGTGAAATCGTTGATATCGTCGATT |
| | | ACGTCATGAACTACGAAATCAGCTCTAAAGTG |
| | | GCCTACGACACCGCACATTACTGCCTGCTCGA |
| | | CACGCTCGGCTGCGGTCTGGAAGCTCTCGAAT |
| | | ACCCGGCCTGTAAAAAACTGCTGGGGCCAATT |
| | | GTTCCCGGCACCGTCGTACCCAACGGCGTGCG |
| | | CGTCCCCGGAACTCAGTTCCAGCTCGACCCCG |
| | | TCCAGGCGGCATTTAACATCGGCGCGATGATC |
| | | CGCTGGCTCGATTTCAACGATACCTGGCTGGC |
| | | GGCGGAGtggactCATCCTTCCGACAACCTCG |
| | | GCGGCATTCTGGCAACGGCGGACTGGCTTTCG |
| | | CGCAACGCGGTCGCCAGCGGCAAAGCGCCGTT |
| | | GACCATGAAACAGGTGCTGACCGCAATGATCA |
| | | AAGCCCATGAAATTCAGGGCTGCATCGCGCTG |
| | | GAAAACTCCTTTAACCGCGTCGGCCTCGACCA |
| | | CGTTCTGTTAGTGAAAGTGGCTTCCACCGCCG |
| | | TGGTCGCCGAAATGCTCGGCCTGACCCGCGAG |
| | | GAAATTCTCAACGCCGTTTCGCTGGCGTGGGT |
| | | GGACGGTCAGTCGCTGCGCACCTATCGCCATG |
| | | CGCCGAACACCGGCACGCGTAAATCCTGGGCG |
| | | GCGGGCGATGCCACTTCCCGCGCGGTACGTCT |
| | | GGCACTGATGGCGAAAACGGGCGAAATGGGTT |
| | | ACCCGTCAGCCCTAACCGCGCCGGTATGGGGC |
| | | TTCTACGACGTCTCCTTTAAAGGTGAATCGTT |
| | | CCGCTTCCAGCGTCCGTACGGTTCTTACGTCA |
| | | TGGAGAATGTGCTGTTCAAAATCTCCTTCCCG |
| | | GCGGAGTTCCACTCCCAGACGGCAGTTGAAGC |
| | | GGCGATGACGCTCTATGAACAGATGCAGGCAG |
| | | CAGGCAAGACGGCGGCGGATATCGAAAAAGTG |
| | | ACCATTCGCACCCACGAAGCCTGTATTCGCct |
| | | aATCGACAAAAAGGGGCCGCTCAATAACCCGG |
| | | CTGACCGCGACCACTGCATTCAGTACATGGTG |
| | | GCGATCCCGCTGTTATTCGGGCGCTTAACGGC |
| | | GGCAGATTACGAGGACAACGTTGCGCAAGATA |
| | | AACGCATCGACGCCCTGCGCGAGAAGATCAAT |
| | | TGCTTTGAAGATCCGGCATTTACCGCTGACTA |
| | | CCACGACCCGGAAAAACGCGCCATCGCCAATG |
| | | CCATTACCCTTGAGTTCACCGACGGCACACGA |
| | | TTTGAAGAAGTGGTGGTGGAGTACCCCATTGG |
| | | TCATGCTCGCCGCCGTCAGGATGGTATTCCGA |
| | | AACTGGTCGATAAATTCAAAATCAATCTCGCG |
| | | CGCCAGTTCCCGACTCGCCAACAGCAGCGCAT |
| | | TCTGGAGGTTTCTCTCGACAGAACTCGCCTGG |
| | | AACAGATGCCGGTCAATGAGTATCTCGACCTG |
| | | TACGTCATTTAA |

TABLE 2-continued

| SEQ ID NO: | Name | Sequence |
|---|---|---|
| 11 | PrpD$^{VT}$ | ATGTCAGCTCAAATCAACAACATCCGCCCGGA<br>ATTTGATCGTGAAATCGTTGATATCGTCGATT<br>ACGTCATGAACTACGAAATCAGCTCTAAAGTG<br>GCCTACGACACCGCACATTACTGCCTGCTCGA<br>CACGCTCGGCTGCGGTCTGGAAGCTCTCGAAT<br>ACCCGGCCTGTAAAAAACTGCTGGGGCCAATT<br>GTTCCCGGCACCGTCGTACCCAACGGCGTGCG<br>CGTCCCCGGAACTCAGTTCCAGCTCGACCCCG<br>TCCAGGCGGCATTTAACATCGGCGCGATGATC<br>CGCTGGCTCGATTTCAACGATACCTGGCTGGC<br>GGCGGAGgttactCATCCTTCCGACAACCTCG<br>GCGGCATTCTGGCAACGGCGGACTGGCTTTCG<br>CGCAACGCGGTCGCCAGCGGCAAAGCGCCGTT<br>GACCATGAAACAGGTGCTGACCGCAATGATCA<br>AAGCCCATGAAATTCAGGGCTGCATCGCGCTG<br>GAAAACTCCTTTAACCGCGTCGGCCTCGACCA<br>CGTTCTGTTAGTGAAAGTGGCTTCCACCGCCG<br>TGGTCGCCGAAATGCTCGGCCTGACCCGCGAG<br>GAAATTCTCAACGCCGTTTCGCTGGCGTGGGT<br>GGACGGTCAGTCGCTGCGCACCTATCGCCATG<br>CGCCGAACACCGGCACGCGTAAATCCTGGGCG<br>GCGGGCGATGCCACTTCCCGCGCGGTACGTCT<br>GGCACTGATGGCGAAAACGGGCGAAATGGGTT<br>ACCCGTCAGCCCTAACCGCGCCGGTATGGGGC<br>TTCTACGACGTCTCCTTTAAAGGTGAATCGTT<br>CCGCTTCCAGCGTCCGTACGGTTCTTACGTCA<br>TGGAGAATGTGCTGTTCAAAATCTCCTTCCCG<br>GCGGAGTTCCACTCCCAGACGGCAGTTGAAGC<br>GGCGATGACGCTCTATGAACAGATGCAGGCAG<br>CAGGCAAGACGGCGGCGGATATCGAAAAAGTG<br>ACCATTCGCACCCACGAAGCCTGTATTCGCat<br>CATCGACAAAAAGGGGCCGCTCAATAACCCGG<br>CTGACCGCGACCACTGCATTCAGTACATGGTG<br>GCGATCCCGCTGTTATTCGGGCGCTTAACGGC<br>GGCAGATTACGAGGACAACGTTGCGCAAGATA<br>AACGCATCGACGCCCTGCGCGAGAAGATCAAT<br>TGCTTTGAAGATCCGGCATTTACCGCTGACTA<br>CCACGACCCGGAAAAACGCGCCATCGCCAATG<br>CCATTACCCTTGAGTTCACCGACGGCACACGA<br>TTTGAAGAAGTGGTGGTGGAGTACCCCATTGG<br>TCATGCTCGCCGCCGTCAGGATGGTATTCCGA<br>AACTGGTCGATAAATTCAAAATCAATCTCGCG<br>CGCCAGTTCCCGACTCGCCAACAGCAGCGCAT<br>TCTGGAGGTTTCTCTCGACAGAACTCGCCTGG<br>AACAGATGCCGGTCAATGAGTATCTCGACCTG<br>TACGTCATTTAA |
| 12 | PrpD$^{VL}$ | ATGTCAGCTCAAATCAACAACATCCGCCCGGA<br>ATTTGATCGTGAAATCGTTGATATCGTCGATT<br>ACGTCATGAACTACGAAATCAGCTCTAAAGTG<br>GCCTACGACACCGCACATTACTGCCTGCTCGA<br>CACGCTCGGCTGCGGTCTGGAAGCTCTCGAAT<br>ACCCGGCCTGTAAAAAACTGCTGGGGCCAATT<br>GTTCCCGGCACCGTCGTACCCAACGGCGTGCG<br>CGTCCCCGGAACTCAGTTCCAGCTCGACCCCG<br>TCCAGGCGGCATTTAACATCGGCGCGATGATC<br>CGCTGGCTCGATTTCAACGATACCTGGCTGGC<br>GGCGGAGgttggcCATCCTTCCGACAACCTCG<br>GCGGCATTCTGGCAACGGCGGACTGGCTTTCG<br>CGCAACGCGGTCGCCAGCGGCAAAGCGCCGTT<br>GACCATGAAACAGGTGCTGACCGCAATGATCA<br>AAGCCCATGAAATTCAGGGCTGCATCGCGCTG<br>GAAAACTCCTTTAACCGCGTCGGCCTCGACCA<br>CGTTCTGTTAGTGAAAGTGGCTTCCACCGCCG<br>TGGTCGCCGAAATGCTCGGCCTGACCCGCGAG<br>GAAATTCTCAACGCCGTTTCGCTGGCGTGGGT<br>GGACGGTCAGTCGCTGCGCACCTATCGCCATG<br>CGCCGAACACCGGCACGCGTAAATCCTGGGCG<br>GCGGGCGATGCCACTTCCCGCGCGGTACGTCT<br>GGCACTGATGGCGAAAACGGGCGAAATGGGTT<br>ACCCGTCAGCCCTAACCGCGCCGGTATGGGGC<br>TTCTACGACGTCTCCTTTAAAGGTGAATCGTT<br>CCGCTTCCAGCGTCCGTACGGTTCTTACGTCA<br>TGGAGAATGTGCTGTTCAAAATCTCCTTCCCG<br>GCGGAGTTCCACTCCCAGACGGCAGTTGAAGC<br>GGCGATGACGCTCTATGAACAGATGCAGGCAG<br>CAGGCAAGACGGCGGCGGATATCGAAAAAGTG |

TABLE 2-continued

| SEQ ID NO: | Name | Sequence |
|---|---|---|
| | | ACCATTCGCACCCACGAAGCCTGTATTCGCct aATCGACAAAAAGGGGCCGCTCAATAACCCGG CTGACCGCGACCACTGCATTCAGTACATGGTG GCGATCCCGCTGTTATTCGGGCGCTTAACGGC GGCAGATTACGAGGACAACGTTGCGCAAGATA AACGCATCGACGCCCTGCGCGAGAAGATCAAT TGCTTTGAAGATCCGGCATTTACCGCTGACTA CCACGACCCGGAAAAACGCGCCATCGCCAATG CCATTACCCTTGAGTTCACCGACGGCACACGA TTTGAAGAAGTGGTGGTGGAGTACCCCATTGG TCATGCTCGCCGCCGTCAGGATGGTATTCCGA AACTGGTCGATAAATTCAAAATCAATCTCGCG CGCCAGTTCCCGACTCGCCAACAGCAGCGCAT TCTGGAGGTTTCTCTCGACAGAACTCGCCTGG AACAGATGCCGGTCAATGAGTATCTCGACCTG TACGTCATTTAA |
| 13 | J23115 promoter | tttatagctagctcagcccttggtacaatgct agc |
| 14 | J23114 promoter | tttatggctagctcagtcctaggtacaatgct agc |
| 15 | J23110 promoter | tttacggctagctcagtcctaggtacaatgct agc |
| 16 | J23100 promoter | TTGACGGCTAGCTCAGTCCTAGGTACAGTGCT AGC |
| 17 | PrpD wild type | ATGTCAGCTCAAATCAACAACATCCGCCCGGA ATTTGATCGTGAAATCGTTGATATCGTCGATT ACGTCATGAACTACGAAATCAGCTCTAAAGTG GCCTACGACACCGCACATTACTGCCTGCTCGA CACGCTCGGCTGCGGTCTGGAAGCTCTCGAAT ACCCGGCCTGTAAAAAACTGCTGGGGCCAATT GTTCCCGGCACCGTCGTACCCAACGGCGTGCG CGTCCCCGGAACTCAGTTCCAGCTCGACCCCG TCCAGGCGGCATTTAACATCGGCGCGATGATC CGCTGGCTCGATTTCAACGATACCTGGCTGGC GGCGGAGTGGGGCCATCCTTCCGACAACCTCG GCGGCATTCTGGCAACGGCGGACTGGCTTTCG CGCAACGCGGTCGCCAGCGGCAAAGCGCCGTT GACCATGAAACAGGTGCTGACCGCAATGATCA AAGCCCATGAAATTCAGGGCTGCATCGCGCTG GAAAACTCCTTTAACCGCGTCGGCCTCGACCA CGTTCTGTTAGTGAAAGTGGCTTCCACCGCCG TGGTCGCCGAAATGCTCGGCCTGACCCGCGAG GAAATTCTCAACGCCGTTTCGCTGGCGTGGGT GGACGGTCAGTCGCTGCGCACCTATCGCCATG CGCCGAACACCGGCACGCGTAAATCCTGGGCG GCGGGCGATGCCACTTCCCGCGCGGTACGTCT GGCACTGATGGCGAAAACGGGCGAAATGGGTT ACCCGTCAGCCCTAACCGCGCCGGTATGGGGC TTCTACGACGTCTCCTTTAAAGGTGAATCGTT CCGCTTCCAGCGTCCGTACGGTTCTTACGTCA TGGAGAATGTGCTGTTCAAAATCTCCTTCCCG GCGGAGTTCCACTCCCAGACGGCAGTTGAAGC GGCGATGACGCTCTATGAACAGATGCAGGCAG CAGGCAAGACGGCGGCGGATATCGAAAAAGTG ACCATTCGCACCCACGAAGCCTGTATTCGCAT CATCGACAAAAAGGGGCCGCTCAATAACCCGG CTGACCGCGACCACTGCATTCAGTACATGGTG GCGATCCCGCTGTTATTCGGGCGCTTAACGGC GGCAGATTACGAGGACAACGTTGCGCAAGATA AACGCATCGACGCCCTGCGCGAGAAGATCAAT TGCTTTGAAGATCCGGCATTTACCGCTGACTA CCACGACCCGGAAAAACGCGCCATCGCCAATG CCATTACCCTTGAGTTCACCGACGGCACACGA TTTGAAGAAGTGGTGGTGGAGTACCCCATTGG TCATGCTCGCCGCCGTCAGGATGGTATTCCGA AACTGGTCGATAAATTCAAAATCAATCTCGCG CGCCAGTTCCCGACTCGCCAACAGCAGCGCAT TCTGGAGGTTTCTCTCGACAGAACTCGCCTGG AACAGATGCCGGTCAATGAGTATCTCGACCTG TACGTCATTTAA |

TABLE 2-continued

| SEQ ID NO: | Name | Sequence |
|---|---|---|
| 18 | Synthetic 5' UTR (Cad) | AAAAAAAACAAAAGGAGCATCACCC |
| 19 | Synthetic 5' UTR (PrpD and variant) | CAACAAAAAAAAAGGAGCATCCTAC |

Collectively, the present inventors have improved the novel cis-aconitate synthesis enzyme and found that the new carbon flow to itaconate of the recombinant microorganisms introduced with the novel cis-aconitate synthesis enzyme was separated from the existing TCA cycle based on the activity of the enzyme, and finally the productivity of itaconate was increased. Therefore, the recombinant microorganism of the present disclosure can be variously used in the field of itaconate production.

As described above, specific parts of the present disclosure have been described in detail, and it will be apparent to those skilled in the art that these specific techniques are merely preferred embodiments, and the scope of the present disclosure is not limited thereto. Therefore, the substantial scope of the present disclosure will be defined by the appended claims and their equivalents.

What is claimed is:

1. An expression cassette for introducing an itaconate production pathway comprising a 2-methylcitrate dehydratase (PrpD) gene represented by a nucleotide sequence selected from the group consisting of SEQ ID NOs: 1, and 7 to 12, and further comprising a nucleotide sequence of SEQ ID NO: 17.

2. The expression cassette for introducing the itaconate production pathway of claim 1, further comprising:

a cis-aconitate decarboxylase (Cad) gene represented by a nucleotide sequence set forth in SEQ ID NO: 2.

3. The expression cassette for introducing the itaconate production pathway of claim 2, further comprising:

a Tac promoter represented by a nucleotide sequence set forth in SEQ ID NO: 5.

4. The expression cassette for introducing the itaconate production pathway of claim 1, further comprising:

a synthetic 5' untranslated region (5' UTR) represented by a nucleotide sequence set forth in SEQ ID NO: 18 or 19.

5. The expression cassette for introducing the itaconate production pathway of claim 1, further comprising:

a promoter selected from the group consisting of SEQ ID NOs: 6, and 13 to 16.

6. A recombinant vector for producing itaconate comprising the expression cassette according to claim 1.

7. A recombinant microorganism for producing itaconate, comprising a PrpD gene represented by a nucleotide sequence selected from the group consisting of SEQ ID NOs: 1, and 7 to 12, and further comprising a nucleotide sequence of SEQ ID NO: 17 is introduced.

8. The recombinant microorganism for producing itaconate of claim 7, further comprising:

a Cad gene represented by a nucleotide sequence set forth in SEQ ID NO: 2.

9. The recombinant microorganism for producing itaconate of claim 8, further comprising:

a Tac promoter represented by a nucleotide sequence set forth in SEQ ID NO: 5.

10. The recombinant microorganism for producing itaconate of claim 7, further comprising:

an aconitase B (AcnB) gene represented by a nucleotide sequence set forth in SEQ ID NO: 3.

11. The recombinant microorganism for producing itaconate of claim 7, wherein an iclR gene represented by a nucleotide sequence set forth in SEQ ID NO: 4 is deleted.

12. The recombinant microorganism for producing itaconate of claim 7, further comprising:

a promoter selected from the group consisting of SEQ ID NOs: 6, and 13 to 16.

13. The recombinant microorganism for producing itaconate of claim 7, further comprising:

a synthetic 5' UTR represented by a nucleotide sequence set forth in SEQ ID NO: 18 or 19.

14. A method for producing itaconate comprising culturing the recombinant microorganism for producing itaconate of claim 7.

* * * * *